(12) United States Patent
Sano et al.

(10) Patent No.: US 6,430,034 B2
(45) Date of Patent: Aug. 6, 2002

(54) CHIP CAPACITOR HAVING EXTERNAL RESIN PACKAGING

(75) Inventors: Mitsunori Sano; Kazunori Watanabe; Hideaki Sato; Kazuhiro Mine, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/826,253

(22) Filed: Apr. 4, 2001

(30) Foreign Application Priority Data

Apr. 7, 2000 (JP) ........................................ 2000-107035

(51) Int. Cl.$^7$ ........................... H01G 9/04; H01G 9/042
(52) U.S. Cl. ............................... 361/528; 361/529
(58) Field of Search ................... 361/528, 529, 361/532, 533, 538, 540, 508, 509, 535

(56) References Cited

U.S. PATENT DOCUMENTS

| | | | |
|---|---|---|---|
| 4,697,869 A | | 10/1987 | So et al. |
| 4,852,964 A | | 8/1989 | Holland et al. |
| 5,319,734 A | | 6/1994 | Buzzetti |
| 5,638,253 A | * | 6/1997 | Hasegawa ............... 361/535 |
| 5,661,628 A | * | 8/1997 | Yamagami ............ 361/275.4 |

FOREIGN PATENT DOCUMENTS

| JP | 60-66807 | 4/1985 |
|---|---|---|
| JP | 60-220921 | 11/1985 |

OTHER PUBLICATIONS

Nanometer Technologies, Variable Attenuators—2000 Series, Web Page–http.//www.nanometer.com/Products/Attenuators/Atten_Variable/atten_variable.htm, (Admitted Prior Art).

* cited by examiner

*Primary Examiner*—Anthony Dinkins
(74) *Attorney, Agent, or Firm*—Hayes Soloway P.C.

(57) ABSTRACT

The present invention provides a chip capacitor, a fabrication method for the same, and a metal mold that can prevent the occurrence of the chip standing phenomenon even when carrying out soldering using reflow soldering, and that be applied to further down-sizing an decreasing of weight. Curved parts 26 and 36 that extend beyond the connecting tongue pieces 21 and 31 of side piece parts 22 and 32 rising in an upward diagonal direction with respect to the connecting tongue pieces 21 and 31 are formed by press bending processing, and thereby the side piece parts 22 and 32 are exposed in an upward rising direction relative to the connecting tongue pieces 21 and 31 at the external end surfaces 15b and 15c of the external resin packaging.

9 Claims, 12 Drawing Sheets

CHIP CAPACITOR HAVING EXTERNAL RESIN PACKAGING

BACKGROUND OF THE INVENTION

1. Field of the Invention

The present invention relates to a chip capacitor, a fabrication method for the same, and a metal mold.

2. Description of the Related Art

Japanese Unexamined Patent Application, First Publication No. Sho 60-66807 is a publication relating to a conventional capacitor. In this capacitor, a anode terminal embedded in the capacitor element is connected to a positive terminal, and provided with an external resin package with resin packaging provided such that the cathode terminal side of the capacitor element is connected to the negative terminal. In addition, Japanese Unexamined Patent Application, First Publication No. Sho 60-220921, is another publication related to conventional capacitors. This capacitor is provided with an external resin packaging such that the electrode surfaces on both sides of the capacitor element are connected to both terminals.

However, in recent years electronic devices such as mobile telephones require increasingly high functionality and at the same time decreasing weight, and the capacitors used in the electronic devices must also become smaller and more lightweight than they are at present.

In both of the above-described conventional capacitors, the packaging surface side of the terminal is flat, and the capacitors are soldered to printed circuit boards on this flat part. However, when the soldering is carried out using reflow soldering, there is the problem that what is termed the chip-standing phenomenon (also called the Manhattan phenomenon or the tombstone phenomenon), in which the component ends up standing on one end due to the surface tension of the solder, occurs easily. Furthermore, because this type of chip-standing phenomenon occurs particularly easily in ultra-small chips designed for small size and decreased weight, this is a problem that is inseparable from dealing with this type of small size and low weight design.

SUMMARY OF THE INVENTION

It is an object of the present invention to provide a chip capacitor, a fabrication method for the same, and a metal mold that can prevent the occurrence of the chip-standing phenomenon even when carrying out soldering using reflow soldering, and furthermore, can be adapted to reducing size and weight.

In order to attain this object, a first aspect of the invention is a chip capacitor having an external resin packaging formed such that a capacitor element is connected to both anode and cathode terminals thereof, wherein both or the terminals comprise a flat base plate that is exposed on the mounting surface side of the external resin packaging, connecting tongue pieces that rise relative to the flat plate and are connected to the capacitor element, and side piece parts that extend beyond the connecting tongue piece from the flat plate to the external end surface of the external resin packaging in a direction opposite to the flat plate, and further wherein ends of the side piece parts are exposed beyond their mounting surface sides to the external end surface of the external resin packaging at the diagonally rising side due to curved parts being formed by press processing that extend beyond the connecting tongue pieces rising in a diagonal direction relative to the connecting tongue pieces to the external end surface, and at the same time the mounting surface side is also exposed up to the external end surface.

In this manner, because curved parts being formed by press processing that extend beyond the connecting tongue pieces rising in a diagonal direction relative to the connecting tongue pieces to the external end surface, the side piece parts are exposed beyond the mounting surface to the external end surface of the external resin packaging at the side where the connecting tongue pieces rise, and at the same time, the mounting surface side is also exposed up to the external end surface.

Thereby, when the side piece parts are soldered to the printed circuit board by reflow soldering, the solder is trapped in the space under of the curved part of the side piece parts, and as a result, the occurrence of the chip-standing phenomenon can be prevented. Therefore, the occurrence of the chip-standing phenomenon can be prevented even when carrying out soldering using reflow soldering, and furthermore, this is in line with small size and decreasing weight.

Furthermore, because the curved parts are formed by press bending processing, fabrication is easy and the cost increases can be restrained.

In addition, because the structure has curved parts formed beyond the connecting tongue piece to the external end surface side of the external resin packaging, in other words, a structure in which the curved parts are interposed between the external end surface and the connecting tongue piece, a gap between the external end surface and the connecting tongue piece can be reliably opened, and positional relationships are attained in which the connecting tongue pieces can be reliably buried in the external resin packaging. As a result, the remarkable effects are attained that the capacitor element connected to a connecting tongue piece can be reliably buried in the external resin packaging, the moisture resistance can be maintained, and in particular, the leakage current characteristics can be maintained.

A second aspect of the chip capacitor of the present invention according to the first aspect is characterized in the curved parts having a bow shape.

In this manner, because the curved parts have a bow shape, the contact surface area in a curved part with the solder can be made large, and the reliability of the connection can be increased. In addition, because the curved parts are exposed, visual confirmation of the connection by the solder during packaging is easy.

A third aspect of the chip capacitor of the present invention according to the first and second aspect is characterized in the areas of both terminals exposed on the mounting surface side being equal to each other.

In this manner, because the areas of both terminals exposed to the mounting surface side are equal to each other, the contact area with the printed circuit board is equal, and as a result, the occurrence of the chip standing phenomenon during reflow soldering can be reliable prevented.

A fourth aspect of the chip capacitor of the present invention according to the first through third aspects is characterized in the height of the curved parts from the mounting surface being two times the height of the thickness of the base plate or greater.

In this manner, because the height of a curved part from the mounting surface is two times the height of the thickness of the base plate or greater, the solder can be sufficiently trapped in the space under the curved parts, and as a result, the occurrence of the chip standing phenomenon during reflow soldering can be reliably prevented.

A fifth aspect of the chip capacitor of the present invention according to the first through fourth aspects is characterized in the terminal of the cathode having a buried plate that is buried in the external resin packaging parallel to the base plate after being bent in the upward direction relative to the connecting tongue on the side of the base plate opposite to the side piece parts.

Thereby, because the terminal of the cathode is buried in the external resin packaging in the buried part parallel to the base plate in the upward direction relative to the connecting tongue piece, the occurrence of pealing of the terminal from the external resin packaging can be prevented.

A sixth aspect of the chip capacitor of the present invention according to the first through fifth aspects is characterized in a convex dam that projects to the capacitor element side and abuts the mounting surface side of the capacitor element being formed on the base plate.

In this manner, because a convex dam that projects to the capacitor element side and abuts the mounting surface side of the capacitor element is formed on the base plate, when the capacitor element and the base plate are attached using a conducting adhesive such as gold paste, unnecessary flowing out of the conducting adhesive can be prevented, and at the same time the thickness of the conducting adhesive becomes uniform and the disparities in the connection strength is eliminated.

A seventh aspect of the chip capacitor of the present invention according to the first through sixth aspects is characterized in the external resin packaging being formed by a liquid resin being printed using a squeegee.

In this manner, because the external resin packaging is formed by a liquid resin being printed using a squeegee, a metal transfer mold, which is expensive and difficult to fabricate, is not necessary, and as a result, the fabrication costs can be reduced, and at the same time design changes can be responded to immediately.

An eighth aspect of the chip capacitor of the present invention according to the first through sixth aspects is characterized in the external resin packaging being formed using a transfer mold formation method.

In this manner, because the external resin packaging is formed using a transfer mold formation method, the form of the external resin packaging can be stabilized.

A ninth aspect of the chip capacitor of the present invention according to the first through eighth aspects is characterized in a set of both an anode and cathode connected to the capacitor element being respectively provided on the two opposing surfaces of the external resin packaging.

Because both the anode and cathode connected to the capacitor element are respectively provided on the two opposing surfaces of the external resin packaging, there is a two-sided mounting structure and identifying the front and back during packaging becomes unnecessary, and at the same time, the arrangement of the connections overlapping in the thickness direction become easy to implement, and thus uses expand.

A fabrication method for a tenth aspect of a chip capacitor of the present invention is characterized in comprising a first press process that forms a pair of lead terminals by press formation on a flat lead frame so as to be opposite each other and at the same time a connecting tongue piece is formed by cutting out the center part of these lead terminals in the width direction, a second press process that forms convex curved parts by press formation that project in an upward diagonal direction relative to the connecting tongue piece to the side piece formation parts on both sides of the connection tongue pieces in the width direction, a connection process that connects the capacitor element to the connecting tongues of the pair of lead terminals, an external resin packaging process in which the mutually opposite sides of the pair of lead terminals and the capacitor element connected to the pair of lead terminals are integrated by an external resin packaging, and a cutting process that cuts the side piece formation parts at the middle position of the convex curved parts.

In this manner, in a first press process, a pair of lead terminals are formed on the flat lead frame so as to be opposite each other and at the same time connecting tongue pieces are formed by cutting out the center part of these lead terminals in the width direction; in a second press process, convex curved parts are formed that project in an upward diagonal direction relative to the connecting tongue pieces to the side piece formation parts on both sides of the connection tongue pieces in the width direction; in a connection process, the capacitor element is connected to the connecting tongues of the pair of lead terminals formed in the first process; in an external resin packaging process, the sides of the pair of lead terminals opposite to each other and the capacitor element connected to the pair of lead terminals are integrated by an external resin packaging; and in a cutting process, the side piece formation parts are cut at the middle position of the convex curved parts.

Thereby, by forming convex curved parts by a press process that curve in an upward diagonal direction relative to the connecting tongue pieces to the external end surface side of the external resin package beyond the connecting tongue to the side piece parts of the terminals, the side piece parts are exposed more in the upward diagonal direction on the external end surface than the mounting surface, and at the same time a shape can be easily formed for which the mounting surface also is exposed up to the end of the external resin packaging.

A fabrication method for a chip capacitor of an eleventh aspect of the present invention according to the tenth aspect is characterized in the external resin packaging being formed by a liquid resin being printed with a squeegee in the external resin packaging process.

In this manner, because the external resin packaging is formed by a liquid resin being printed with a squeegee in the external resin packaging process, a metal transfer mold, which is high cost and difficult to fabricate, becomes unnecessary, and as a result, fabrication costs can be reduced.

A fabrication method for a chip capacitor of a twelfth aspect of the present invention according to the eleventh aspect is characterized in providing the external resin packaging up to the outer side of the convex curved part of the side piece formation parts in the external resin packaging process, and cutting the external resin packaging on the plane that intersects the center position of the convex curved part of the side piece formation parts.

In this manner, because the external resin packaging is provided up to the outer side of the convex curved part of the side piece formation parts in the external resin packaging process and the external resin packaging is cut on the plane that intersects the center position of the convex curved part of the side piece formation parts, the elimination of the seams at the corners of the external resin packaging produced when the external resin packaging is formed by the liquid resin being printed with a squeegee and adjustment of the shape of the external resin packaging can be carried out in coordination with the cutting of the side piece formation parts.

A fabrication method of the chip capacitor of a twelfth aspect of the present invention according to the tenth aspect is characterized in the external resin packaging process providing the external resin packaging up to the center position of the convex curved part of the side piece formation parts by a transfer mold formation method.

In this manner, because the external resin packaging process provides the external resin packaging up to the center position of the convex curved part of the side piece formation parts by a transfer mold formation method, the shape can be adjusted without cutting the external resin packaging, and can be completed by cutting only the side piece formation parts.

A fabrication method of the chip capacitor of the fourteenth aspect of the present invention according to the thirteenth aspect is characterized in the formation of the convex curved parts in the second press process being carried out with the metal transfer mold used in the external resin packaging process.

In this manner, because the formation of the convex curved parts in the second press process are carried out with a metal transfer mold used in the external resin packaging process, the metal transfer mold can also be used as a metal press mold for the formation of the convex curved parts. Thus, the number of metal molds can be decreased, and the cost can be decreased.

A metal mold according to a fifteenth aspect of the present invention is used in an external resin packaging process of the fabrication method for a chip capacitor having a first formation process that forms by press formation a pair of lead terminals on a flat lead frame so as to be opposite to each other and forms connecting tongue pieces by cutting out the center part of these lead terminals in the width direction, a second process that forms convex curved parts by press formation that protrude in the upward diagonal direction relative to the connecting tongue piece to both of the side piece formation parts of the connecting tongue pieces in the width direction, a connection process that connects the capacitor element to a connecting tongue piece of the pair of lead terminals, an external resin packaging process that integrates with the external resin packaging the mutually opposite sides of the pair of lead terminals and the capacitor element connected to this pair of lead terminals, and a cutting process that cuts the side piece formation parts at the center position of the convex curved parts, and characterized in having a convex part and a concave part for forming the convex curved parts in the second press process.

Thereby, because the formation of the convex curved parts in the second press process can be carried out using the convex part and the concave part of the metal transfer mold used in the external resin packaging process, the metal transfer mold can also be used as a metal press mold for the formation of the convex curved parts. Thus, the number of metal molds can be reduced, the cost reduced, and in addition, the positional relation between the external resin packaging end part and the convex curved parts can be made to coincide easily.

BRIEF DESCRIPTION OF THE DRAWINGS

FIGS. 1A, 1B, 1C, and 1D show the chip capacitor according to a first embodiment of the present invention, wherein FIG. 1A is a drawing of a front cross-section, FIG. 1B is a drawing of the right side surface, FIG. 1C is a drawing of the leftside surface, and FIG. 1D is drawing of the bottom surface.

DETAILED DESCRIPTION OF THE INVENTION

The first embodiment of the present invention will be explained below referring to FIG. 1 to FIG. 15.

Figure 1:
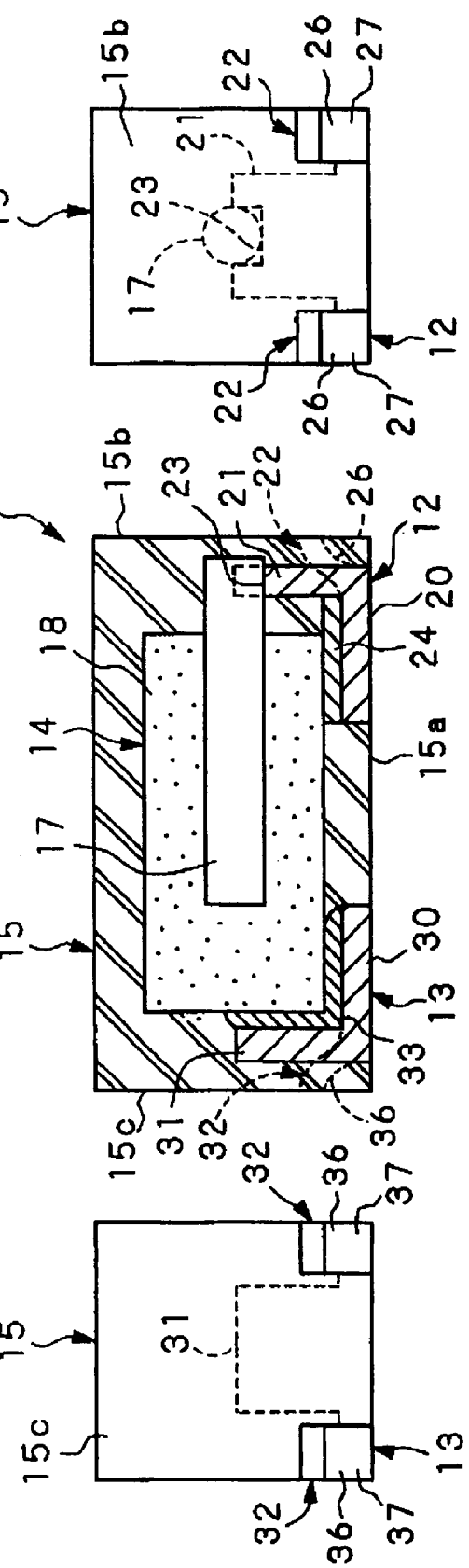

FIG. 1 is a cross-sectional drawing showing the solid electrolyte chip capacitor (chip capacitor) 11 according to the first embodiment. In this solid electrolyte chip capacitor 11, both the anode terminal (terminal) 12 and the cathode terminal (terminal) 13 are connected to the capacitor element 14, and the anode terminal 12, the cathode terminal 13, and the capacitor element 14 are covered in an external resin packaging 15.

The capacitor element 14 has an anode lead 17 and an element body 18 into which the anode lead 17 is exposed on one side from the center.

Figure 2:
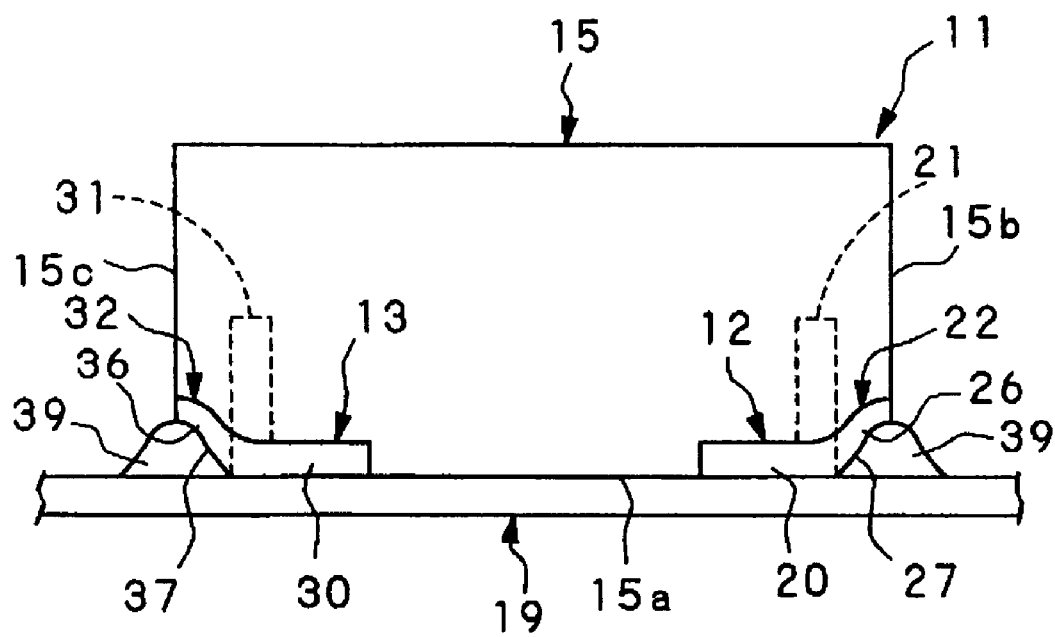
FIG. 2 is a perspective drawing showing the state in which the chip capacitor according to the first embodiment of the present invention is mounted on the printed circuit board.

The external resin packaging 15 has a substantially rectangular parallelepiped shape (it may also have a columnar shape), and as shown in FIG. 2, one mounting surface 15a, which is the lower surface in FIG. 2, is disposed and mounted on a printed circuit board 19.

The anode terminal 12 is a solder plated plate of uniform thickness that is press processed (this processing will be explained below), and comprises a base plate 20 that is exposed on the mounting surface 15a of the external resin packaging 15 on the same plane as the mounting surface 15a, a connecting tongue piece 21 that rises from the center part of the base plate 20 in the direction of the capacitor's width (in the direction perpendicular to the surface of the page in FIG. 1), and connects to the anode lead 17 of the capacitor element 14, and a pair of side piece parts 22 that extend from both of the outer side positions of the connecting tongue piece 21 of the base plate 20 in the direction of the capacitor's width past the connecting tongue piece 21 to the external end surface 15b of the external resin packaging 15 in the opposite direction relative to the base plate 20. Here, both end surfaces of the base plates 20 and the pair of side piece parts 22 in the capacitor's width direction coincide with both end surfaces of the external resin packaging 15 in the same direction.

In the anode terminal 12, a welding recess 23 is formed on the upper part of the connecting tongue piece 21 on the side opposite to the base plate 20 and the side piece parts 22, and the anode lead 17 is connected to the connecting tongue piece 21 by laser welding and the like while mounted in the welding recess 23. In addition, between the base plate 20 of the anode terminal 12 and the element body 18 of the capacitor element 14, an insulating body 24 is interposed. Moreover, the shape of the connecting tongue piece 21 may be the character 'L', and not just a recess.

In addition, the end of both side piece parts 22 of the anode terminal 12 are exposed on the external end surface 15b, rising higher in the diagonal direction than the mounting surface 15a due to a curved parts 26 formed by bend processing that have the same shape, and extend beyond the connecting tongue piece 21 at upward in a diagonal direction relative to the connecting tongue piece 21 to the external end 15b side, which is parallel to and in proximity to the connecting tongue piece 21. Moreover, in this first embodiment, an example is given in which an entire side piece part 22 serves as the curved part 26, but one part of a side piece part 22 may serve as the curved part 26.

Furthermore, the mounting surface 15a sides of both side piece parts 22 are also respectively exposed up to the end of the external end surface 15b. In other words, the external resin packaging 15 is not provided on the mounting surface 15a sides of both side piece parts 22, and as a result, a space 27 having a predetermined height with respect to the mounting surface 15a is provided on the mounting surface 15a side of the curved parts 26. Here, specifically the curved parts 26 of both side piece parts 22 have a bow-shaped curved surface having no flat part on either the upper or lower sides (the side of the connecting tongue piece 21 that rises and the opposite side thereof). Moreover, the center of this bow is positioned on the mounting surface 15a side of the side piece parts 22.

The cathode terminal 13 is a solder plated plate of uniform thickness that is press processed (this processing will be explained below), and comprises a base plate 30 that has the same plane as the mounting surface 15a on the mounting surface 15a side of the external resin packaging 15, has the same form as the base plate 20 of the above-described anode terminal 12, and is exposed on the same plane as the base plate 20; a connecting tongue piece 31 that rises from the center part of the base plate 30 in the direction of the capacitor's width, and connects to the peripheral surface of the element body 18 of the capacitor element 14; and a pair of side piece parts 32 that extends from the position of both outer sides of the connecting tongue piece 31 of the base plate 30 in the direction of the capacitor's width past the connecting tongue piece 31 to the external end surface 15c of the external resin packaging 15 in the opposite direction relative to the base plate 30. Here, the base plate 30 and both end surfaces of the pair of end piece parts 32 in the direction of the capacitor's width coincide with both end surfaces of the external resin packaging 15 in the same direction.

In the cathode terminal 13, a conducting adhesive 33 such as a gold paste is applied from the side surface of the base plate 30 side of the connecting tongue piece 31 to the upper surface of the connecting tongue piece 31 side of the base plate 30, and the element body 18 of the capacitor element 14 is connected via the conducting adhesive 33.

In addition, both side piece parts 32 of the cathode terminal 13 are exposed on the external end surface 15c rising higher in the diagonal direction than the mounting surface 15a due to the curved parts 36 formed by a bending process that have the same shape, and extends beyond the connecting tongue piece 31 rising upward in a diagonal direction relative to the connecting tongue piece 31 to the external end surface 15c side, which is parallel to and in proximity to the connecting tongue piece 31. Moreover, in this first embodiment, an example is given in which an entire side piece part 32 is serves as the curved part 36, but a part of the side piece part 32 may serve as the curved part 36.

Furthermore, the mounting surface 15a sides of both side piece parts 32 are also respectively exposed up to the end of the external end surface 15c. In other words, the external resin packaging 15 is not provided on the mounting surface 15a sides of both side piece parts 32, and as a result, a space 37 having a predetermined height with respect to the mounting surface 15a is provided on the mounting surface 15a side of the curved parts 36. Here, specifically the curved parts 36 of both side piece parts 32 have a bow-shaped curved surface having no flat part on either the upper or lower sides (the side of the connecting tongue piece 31 that rises and the opposite side thereof). Moreover, the center of this bow is positioned on the mounting surface 15a side of the side piece parts 32.

Here, the exposed surface area of the mounting surface 15a side of the base plate 20 of the anode terminal 12 is the same as the exposed surface area of the mounting surface 15a side of the base plate 30 of the cathode terminal 13, and the exposed surface area of the mounting surface 15a side of both side piece parts 22 of the anode terminal 12 is the same as the exposed surface area of the mounting surface 15a side of both side piece parts 32 of the cathode terminal 13, and as a result, both the anode terminal 12 and the cathode terminal 13 both have surface areas exposed on the mounting surface 15a side that are equal.

According to the solid electrolyte chip capacitor 11 of the first embodiment described above, the curved parts 26 formed by press processing that extend beyond the connecting tongue piece 21 of the side piece parts 22 of the anode terminal 12 rising in an upward diagonal direction relative to the connecting tongue piece 21 to the external end 15b side of the external resin packaging 15, and thereby, the side piece parts 22 are exposed on the external end surface 15b of the external resin packaging 15 beyond the mounting surface 15a rising in an upward diagonal direction relative to the connecting tongue piece 21, and at the same time, this mounting surface 15a side is also exposed up to the end of the external end surface 15b. Similarly, the curved parts 36 formed by press processing extend beyond the connecting tongue piece 31 of the side piece parts 32 of the anode terminal 13 rising in an upward diagonal direction relative to the connecting tongue piece 31 to the external end 15c side of the external resin packaging 15, and thereby, the side piece parts 32 are exposed on the external end surface 15c of the external resin packaging 15 beyond the mounting surface 15a rising in an upward diagonal direction relative to the connecting tongue piece 31, and a the same time, its mounting surface 15a side is also exposed up to the end of the external end surface 15c.

Thus, when the base plates 20 and 30 and the side piece parts 22 and 32 are soldered to the printed circuit board 19 by reflow soldering, as shown in FIG. 2, the solder 39 is trapped in the spaces 27 and 37 under the curved parts 26 and 36 of the side piece parts 22 and 32, and as a result, the chip standing phenomenon can be prevented.

Therefore, even if soldering is carried out using reflow soldering, the chip standing phenomenon can be prevented, and furthermore, a further corresponding reduction in size and weight (specifically, the ultra-small 1608 size—L=1.6 mm, W=0.85 mm, T=0.8 mm—and even further downscaling) becomes possible.

Furthermore, the terminals 12 and 13 are plates having a uniform thickness subject to press bending processing, and because side piece parts 22 having the curved part 26 and side piece parts 32 having a curved part 36 are also press bent from the same plate, the fabrication becomes simple and cost increases can be restrained.

Furthermore, in the anode terminal 12, because there is a structure wherein a curved parts 26 are formed closer to the external end surface 15b than the connecting tongue piece 21, that is to say, there is a structure in which the curved parts 26 are interposed between the external end surface 15b and the connecting tongue piece 21, a gap can be reliably formed between the external end wall 15b and the connecting tongue piece 21 and maintain a positional relationship in which the connecting tongue piece 21 is accurately buried in the external resin packaging 15. Similarly, in the cathode terminal 13, because there is a structure wherein a curved parts 36 are formed closer to the external end surface 15c than the connecting tongue piece 31, that is to say, there is a structure in which the curved parts 36 are interposed between the external end surface 15c and the connecting tongue piece 31, a gap can be reliably formed between the external end wall 15c and the connecting tongue piece 31 and maintain a positional relationship in which the connecting tongue is accurately buried in;the external resin packaging 15. As a result, the remarkable effects are attained that the capacitor element 14 connected to a connecting tongue pieces 21 and 31 can be accurately buried in the external resin packaging 14, the moisture resistance characteristics can be maintained, and in particular, the leakage current characteristics can be maintained.

In addition, by making the curved parts 26 and 36 have a bow shape, the contact surface area with the solder 39 in the curved parts 26 and 36 can be made large, and the reliability of the connection can be increased. In addition, because the curved parts 26 and 36 are exposed, visual confirmation of the connection by the solder 39 during packaging is simple.

Furthermore, because the surface area in which both the terminal 12 and 13 is exposed on the mounting surface 15a side are made equal to each other, the contact surface areas on the printed circuit board 19 becomes equal, and as a result, the occurrence of the chip standing phenomenon during reflow soldering can be reliably prevented.

Here, if the height of the curved parts 26 and 36 from the mounting surface 15a is two times the plate thickness of the base plates 20 and 30 or greater, a sufficient amount of solder can be trapped in the spaces 27 and 37, and the chip-standing phenomenon is more advantageously prevented. That is to say, when the height of the curved parts 26 and 36 from the mounting surface 15a is less than two times the plate thickness of the base plates 20 and 30, the amount of colder that is trapped in the spaces 27 and 37 is too small, and the chip-standing phenomenon cannot be sufficiently prevented.

Next, a fabrication method for the solid electrolyte chip capacitor in the above-described first embodiment will be explained.

Figure 3:
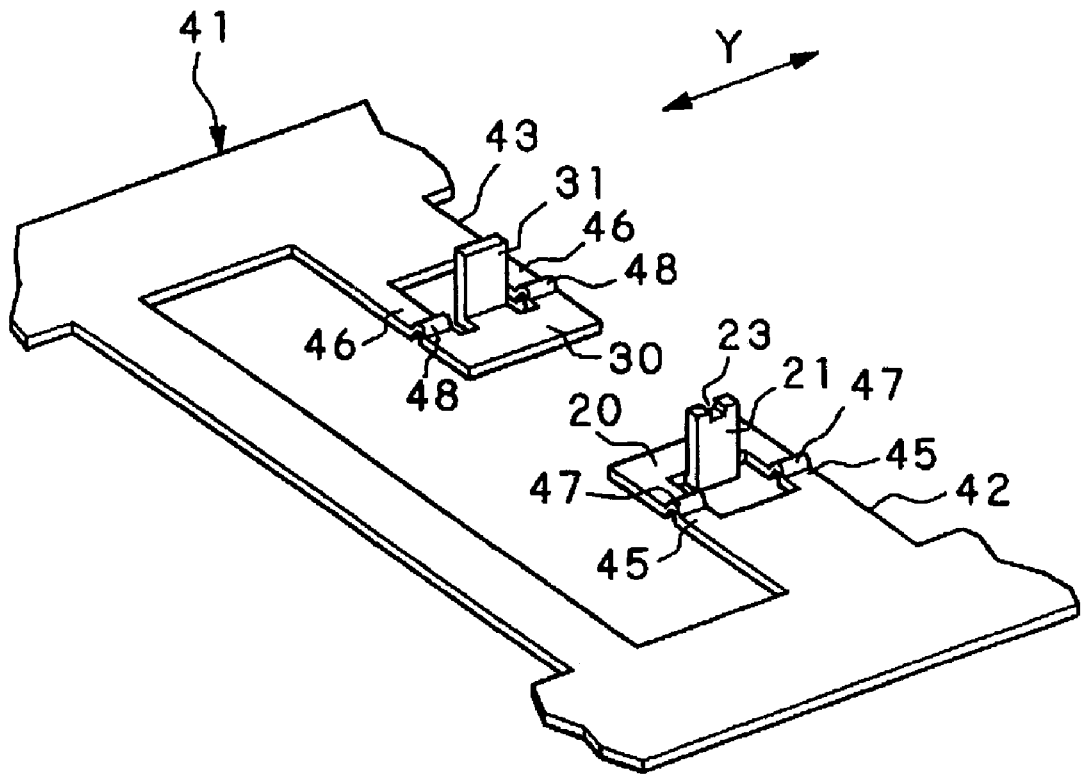
FIG. 3 is a perspective drawing showing the lead frame of the chip capacitor according to the first embodiment of the present invention.

First, by press formation, as shown in FIG. 3, an anode lead terminal 42 and a cathode lead terminal 43 pair are formed opposite each other on the plate-shaped lead frame that has been solder plated. In addition, a connecting tongue piece 21 is formed by cutting out the center part of the anode lead terminal 42 in the width direction (the direction of the arrow Y shown in FIG. 3) of the capacitor on the cathode lead terminal 43 side, and at the same time, due to this cut-out, respective side piece formation parts 45 remain on both outer sides of the connecting tongue piece 21 in the width direction of the capacitor on the anode lead terminal 42 side. A connecting tongue piece 31 is formed by cutting out the center part of the cathode lead terminal 43 in the width direction of the capacitor, and at the same time, due to this cut-out, respective side piece formation parts 46 remain on both outer sides of the connecting tongue piece 31 in the width direction of the capacitor (fist press process).

In addition, by press formation, a convex curved parts 47 are formed by bending protrudes in the shape of a substantially semi-circular projection beyond the connection tongue piece 21 of both side piece parts formation parts 45 of the anode lead terminal 42 rising in an upward direction relative to the connecting tongue 21 to the side that is opposite to the cathode lead terminal 43, and at the same time, a convex curved parts 48 are formed by bending protrudes in the shape of a substantially semi-circular projection beyond the connection tongue piece 31 of both side piece parts formation parts 46 of the anode lead terminal 43 rising in an upward direction relative to the connecting tongue 31 to the side that is opposite to the cathode lead terminal 42 (second press process). Moreover, this second press process can be carried out at the same time as the first press process, but it can also be carried out separately from the first press process if it is carried out before implementing the external resin packaging in the external resin packaging process described below.

In the lead frame 41 formed by the press formation described above, the cathode lead terminal 43 side of the anode lead terminal 42 beyond the connecting tongue 12 becomes the base plate 20 of the anode terminal 12, and the base plate 20 side from the center of the convex curved parts 47 of both side piece parts formation parts 45 of the anode lead terminal 42 becomes both side piece parts 22 of the anode terminal 12 by later cutting out, and the anode lead terminal 42 side of the cathode lead terminal 43 beyond the connecting tongue piece 31 forms the base plate 30 of the cathode terminal 13, and the base plate 30 side from the center of the convex curved parts 48 of both side piece parts formation parts 46 of the cathode lead terminal 43 forms both side piece parts 32 of the cathode terminal 13 by later cutting out. Moreover, the anode lead terminal 42 and the cathode lead terminal 43 pair opposite to each other on the lead frame are for forming one solid electrolyte chip capacitor 11, and on the lead frame 41 (not illustrated), this kind of anode lead terminal 42 and cathode lead terminal 43 pair is disposed in plurality in rows in the width direction of the capacitor.

In addition, after the first press processing has completed, each pair of the connecting tongue piece 21 of the anode lead terminal 41 and the connecting tongue piece 31 of the cathode lead terminal 43 of the lead frame are respectively connected to capacitor element 14 (connection process). Specifically, a conducting adhesive 33 such as a gold paste is applied from the side surface of the base plate 30 side of the connecting tongue piece 31 to the upper surface of the connecting tongue piece 31 side of the base plate 30 on the anode lead terminal 43, and at the same time, an insulator 24 is mounted on the base plate 20 of the anode lead terminal 42, and the element body 18 of the capacitor element 14 is attached to the cathode lead terminal 43 via the conducting adhesive 33. In addition, at this time, the anode electrode 17 of the capacitor element 14 is mounted in the welding recess 23 of the connecting tongue piece 21 of the anode lead terminal 42, and the anode electrode 17 is attached to the connecting tongue piece 21 by laser welding and the like.

Figure 4:
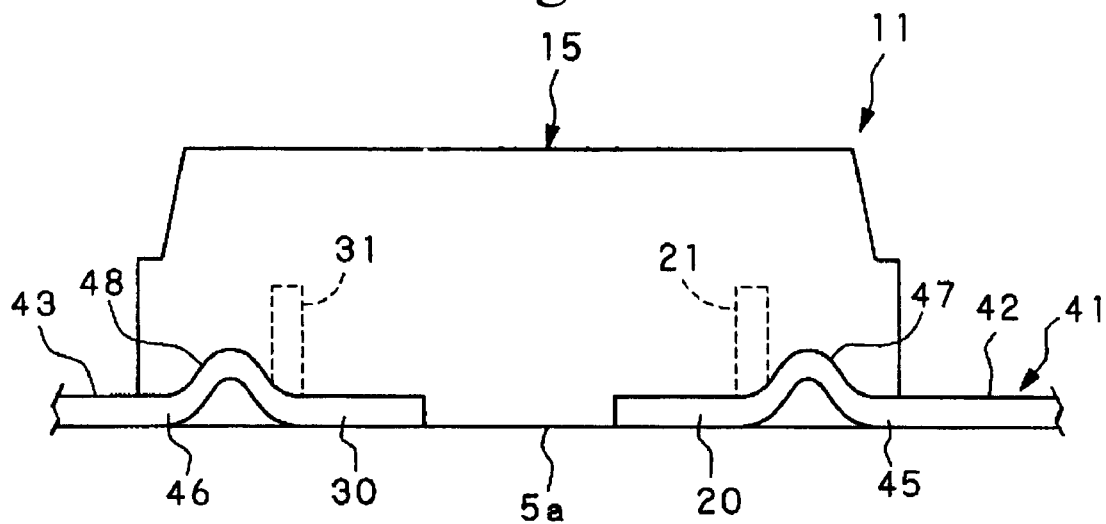
FIG. 4 is a drawing of the front surface showing the state before the cutting f the lead frame of the chip capacitor according to the first embodiment of the present invention.

As shown in FIG. 4, on the mutually opposing sides of the anode lead terminal 42 and the cathode lead terminal 43, or specifically, a part of the connecting tongue piece 21, the base plate 20, and the side piece formation parts 45 of the anode lead terminal 42, a part of the connecting tongue piece 31, the base plate 30, and the side piece formation parts 46 of the cathode lead terminal 43, and the capacitor element 14 connected to the cathode lead terminal 43 and the anode lead terminal 42, are integrally formed with the external resin packaging (external resin packaging process).

Here, in this external resin packaging process, the external resin packaging 15 is formed by a printing method in which the liquid resin is formed by printing with a squeegee or a transfer mold formation method.

First, the printing method will be explained.

The method disclosed in Japanese Patent No. 2,934,174, for example, can be used as the printing method. However, the external resin packaging 15 is formed by the following vacuum printing method.

Figure 5:
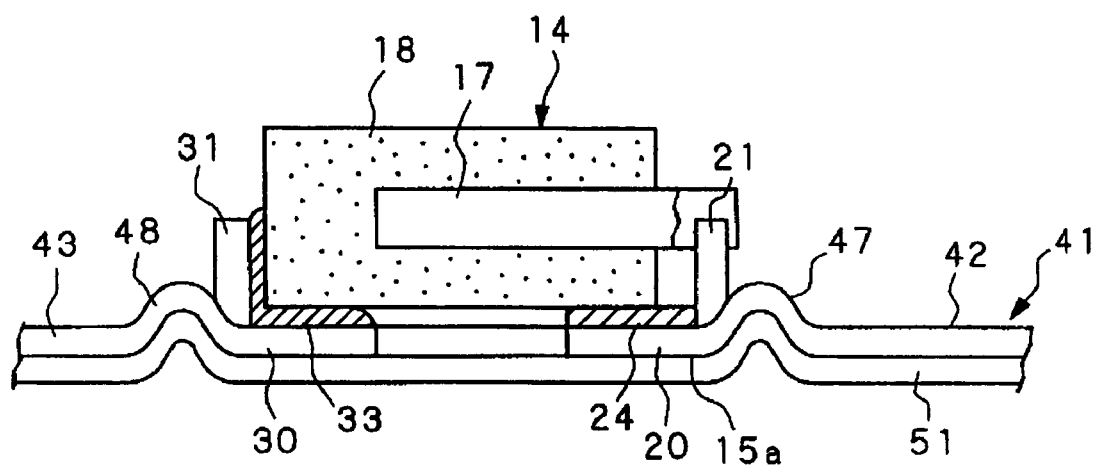
FIG. 5 is a drawing of a front cross-section showing the initial stage of the external resin packaging according to the vacuum printing method for the chip capacitor according to the first embodiment of the present invention.

As shown in FIG. 5, the surface of the side opposite to the rising direction of the connecting tongue pieces 21 and 31 of the lead frame 41 serves as the underside, and on this underside a heat resistant film 51 is applied. This heat resistant film 51 masks the undersurface of the base plates 20 and 30 and the side piece formation parts 45 and 46.

Figure 6:
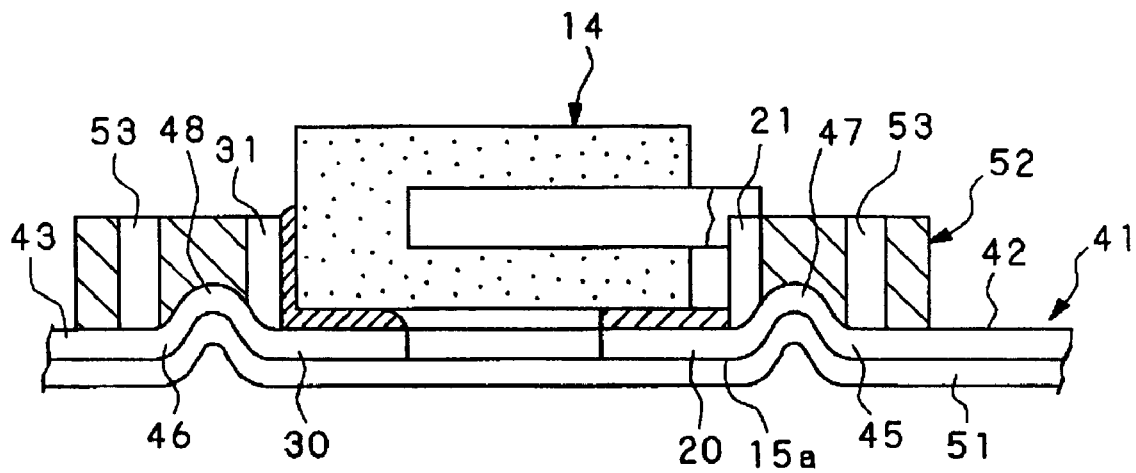
FIG. 6 is a drawing of a front cross-section showing the next stage of the external resin packaging according to the vacuum printing method for the chip capacitor according to the first embodiment of the present invention.

Next, as shown in FIG. 6, a first metal mask 52 is disposed on the upper surface of the lead frame 41. A space 53 is formed in the first metal mask 52 that has a predetermined gap from the top to the bottom relative to the respective outer sides of the convex curved parts 47 and 48 in the direction (below, referred to as the "terminal arrangement direction") of the arrangement of the anode lead terminal 42 and the cathode lead terminal 43, which form pair.

In addition, in the space 53 of this first metal mask 52, under a vacuum or under atmospheric pressure, a liquid resin is imprinted from the top using a squeegee. Thereby, a dam part 54 shown in FIG. 7 having the shape of the space 53 is printed at the position of the space 53 of the lead frame. Moreover, the dam part is printed so as to run in the width direction of the capacitor with respect to the anode lead terminal 42 and the cathode lead terminal 43 arranged in a plurality of rows of pairs on the lead frame 41 (not illustrated).

Figure 7:
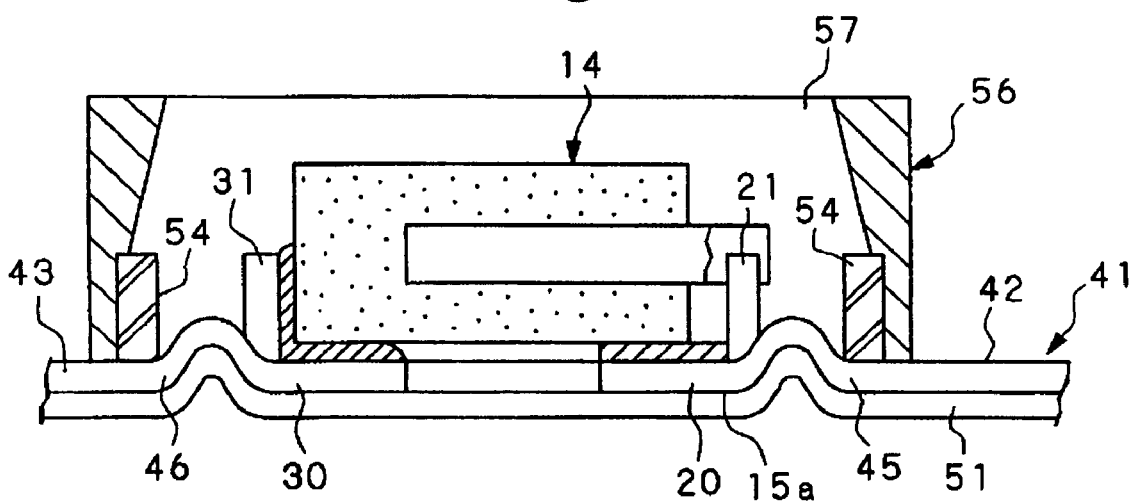
FIG. 7 is a drawing of a front cross-section showing the next stage of the external resin packaging according to the vacuum printing method for the chip capacitor according to the first embodiment of the present invention.

Next, as shown in FIG. 7, a second metal mask 56 replaces the first metal mask 52 on the upper surface of the lead frame 41. In the second metal mask 56, a space 57 is formed from the top to the bottom engaging both dams 54 therein in the terminal arrangement direction. The height of this space 57, which is to say the height of the second metal mask 56, is higher than the capacitor element 14 by a predetermined value and coincides with the height of the final product of the solid electrolyte chip capacitor In addition, in the space 57 of this second metal mask 56, under a vacuum or under atmospheric pressure, a liquid resin is imprinted on the upper surface by a squeegee. Thereby, the main part 58 shown in FIG. 8, having the shape of the space 57, is printed at the position of the space 57 of the lead frame 41. Moreover, at this time, the dam 54 stops the liquid resin at both ends of the space 57 in the terminal arrangement direction. In addition, a main part 58 is printed running in the width direction of the capacitor with respect to the anode lead terminal 42 and the cathode lead terminal 43, which are disposed arranged in a plurality of pairs on the lead frame 41 (not illustrated). Moreover, this printing of the main part 58 is preferably carried out under a vacuum in order to eliminate any bubbles that have been incorporated in the liquid resin.

Figure 8:
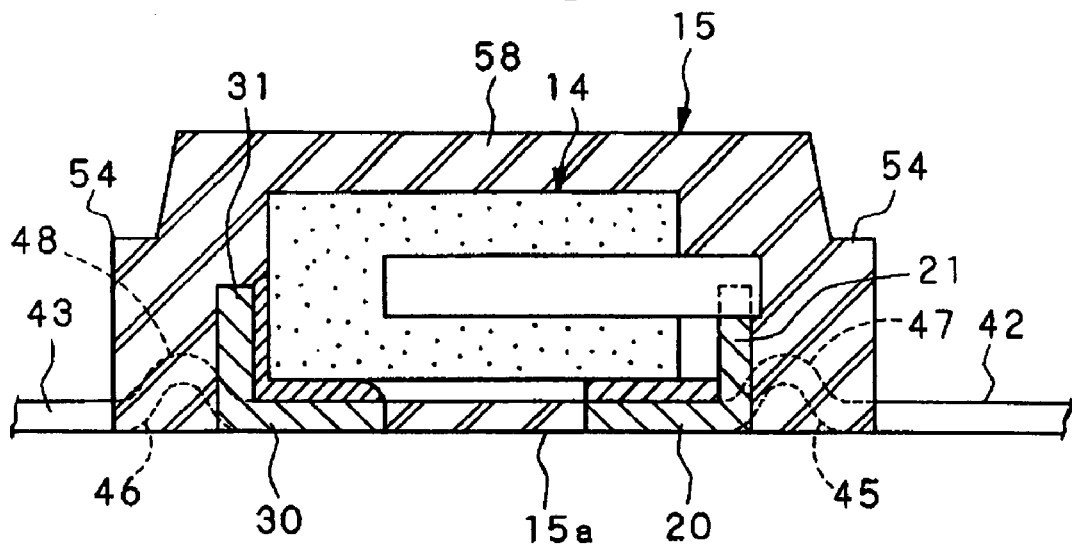
FIG. 8 is a drawing of a front cross-section showing the next stage of the external resin packaging according to the vacuum printing method for the chip capacitor according to the first embodiment of the present invention.

In the case of using the above-described printing process, after the second metal mask 56 is separated, the above liquid resin is dried until it hardens to a degree such that its shape can be maintained (partial hardening), after this partial hardening, as shown in FIG. 8, the thermally resistant film 51 for masking is pealed off the lead frame 41, and the liquid resin is dried until it hardens to attain a predetermined hardness (complete hardening).

Figure 9:
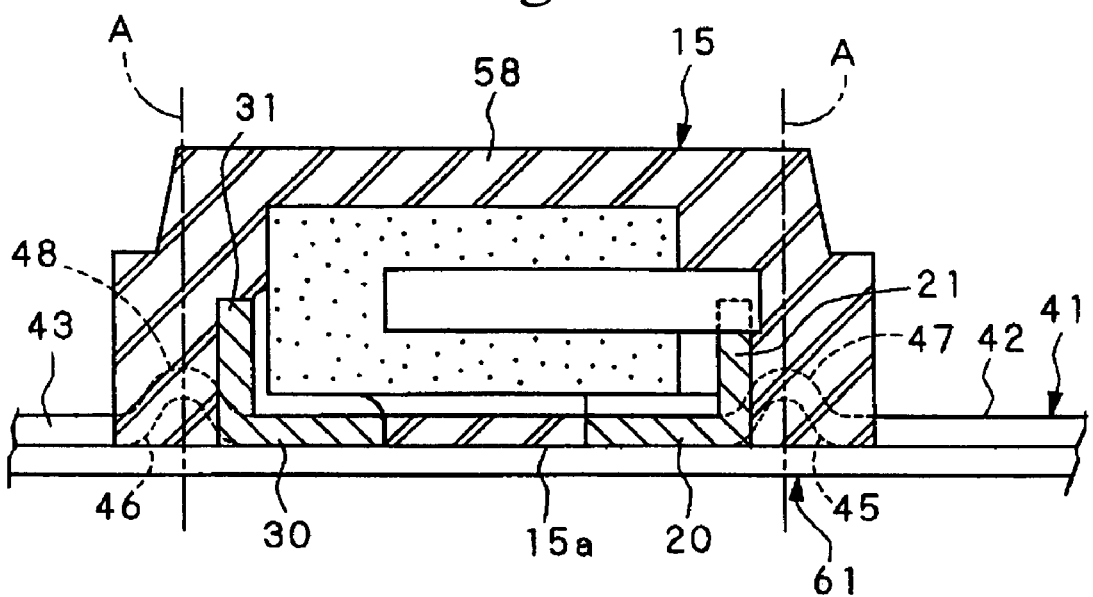
FIG. 9 is a drawing of a front cross-section showing the next stage of the external resin packaging according to the vacuum printing method for the chip capacitor according to the first embodiment of the present invention.
Figure 10:
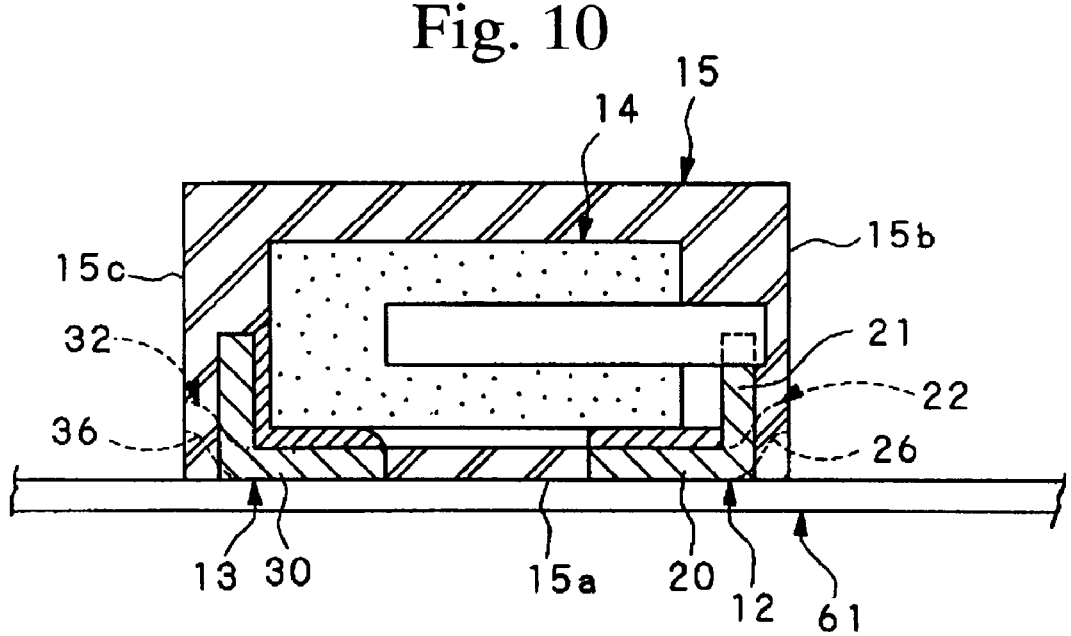
FIG. 10 is a drawing of a front cross-section showing the next stage of the external resin packaging according to the vacuum printing method for the chip capacitor according to the first embodiment of the present invention.

In addition, as shown in FIG. 9, a double-sided tape 51 is attached to the under surface of the lead frame 41.

Next, the lead frame 41 is attached to the jig of a cutting machine (not illustrated) at the under surface of the double-sided tape 61, and by this cutting machine, as shown in FIG.

10, both end parts of the external resin packaging 15 in the terminal arrangement direction are cut off along with the side piece forming parts 45 and 46 at the cutting surface perpendicular to the terminal arrangement direction (cutting process). Here, as shown by the hatched line A in FIG. 9, this cross-sectional surface is at the predetermined middle position of the convex curved part 47 of the side piece formation part 45 and the predetermined middle position of the convex part 48 of the side piece formation part 46, or specifically, at the surface passing through the middle section where the amount of projection is greatest. In addition, the external resin packaging 15 between each pair of anode lead terminals 42 and cathode lead terminals 43, which are disposed in a plurality of rows on the lead frame 41, is cut and removed at the cross-sectional plane along the terminal arrangement direction and perpendicular to the lead frame 41.

During this cutting, the solid electrode chip capacitors 11 are separated one by one, but they are prevented from moving by the common two-sided tape 61 that maintains their positions, and as a result, advantageous cutting can be carried out, and at the same time, after cutting, they do not scatter randomly.

Next, the two-sided tape 61 is removed.

In this manner, the solid electrolyte chip capacitor having the above-described structure can be attained.

In the external resin packaging process, if the above-described printing method is used, because external resin packaging 15 is formed by printing the liquid resin using a squeegee, the high cost and the metal transfer molds, which are difficult to manufacture, are unnecessary, and as a result, there are the effects that the fabrication costs can be reduced, and at the same time, design changes can be responded to immediately.

In addition, as described above, in the external resin packaging process, a resin external package 15 is provided up to the outer side of the convex curved parts 47 and 48 of the side piece formation parts 45 and 46, and during the cutting process, if the external resin packaging 15 is cut at the plane identical to the middle position of the convex curved parts 47 and 48 of the side piece formation parts 45 and 46, there are the effects that the elimination of the seams at the corners of the external resin packaging 15 produced when the external resin packaging 15 is formed by printing the liquid resin with a squeegee and adjustment of the shape of the external resin packaging 15 can be carried out in coordination with the cutting of the side piece formation parts 45 and 46.

Next, the transfer mold formation method are explained.

Figure 11:
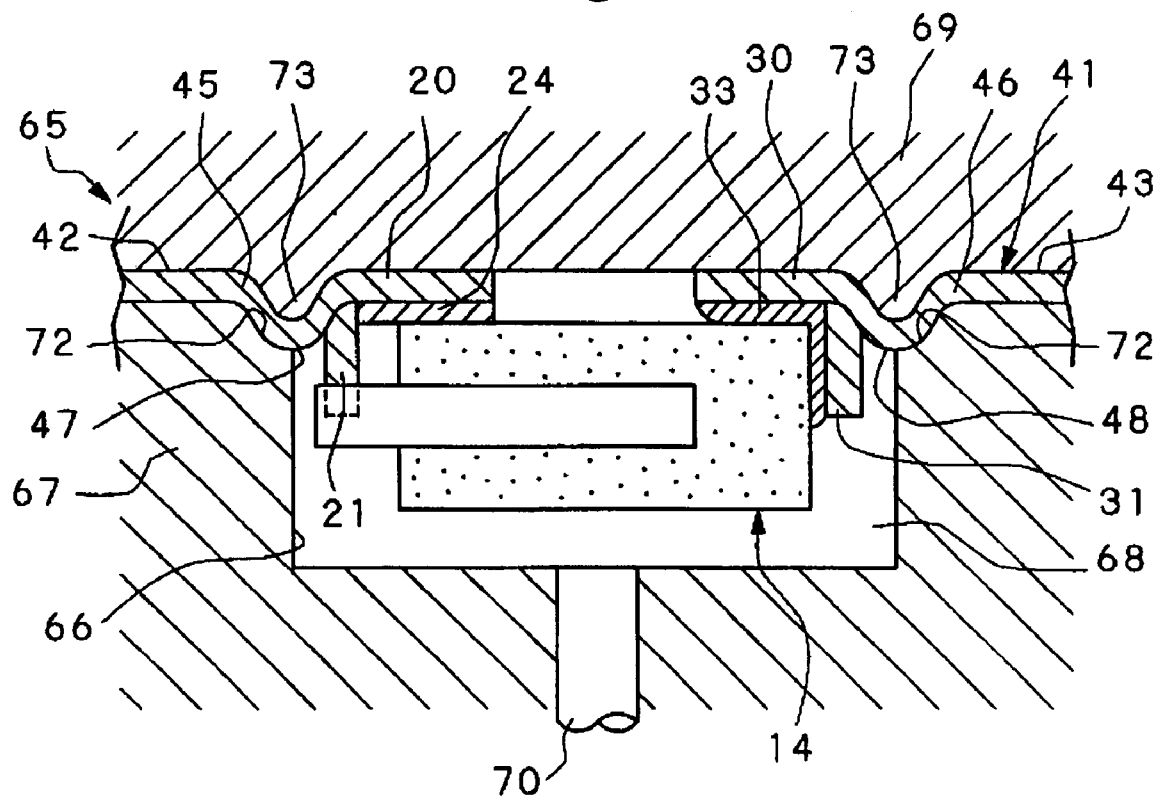
FIG. 11 is a drawing of a front cross-section showing the state before the resin injection into the metal mold used in the external resin packaging according to the transfer mold formation method of the chip capacitor according to the first embodiment of the present invention.
Figure 12:
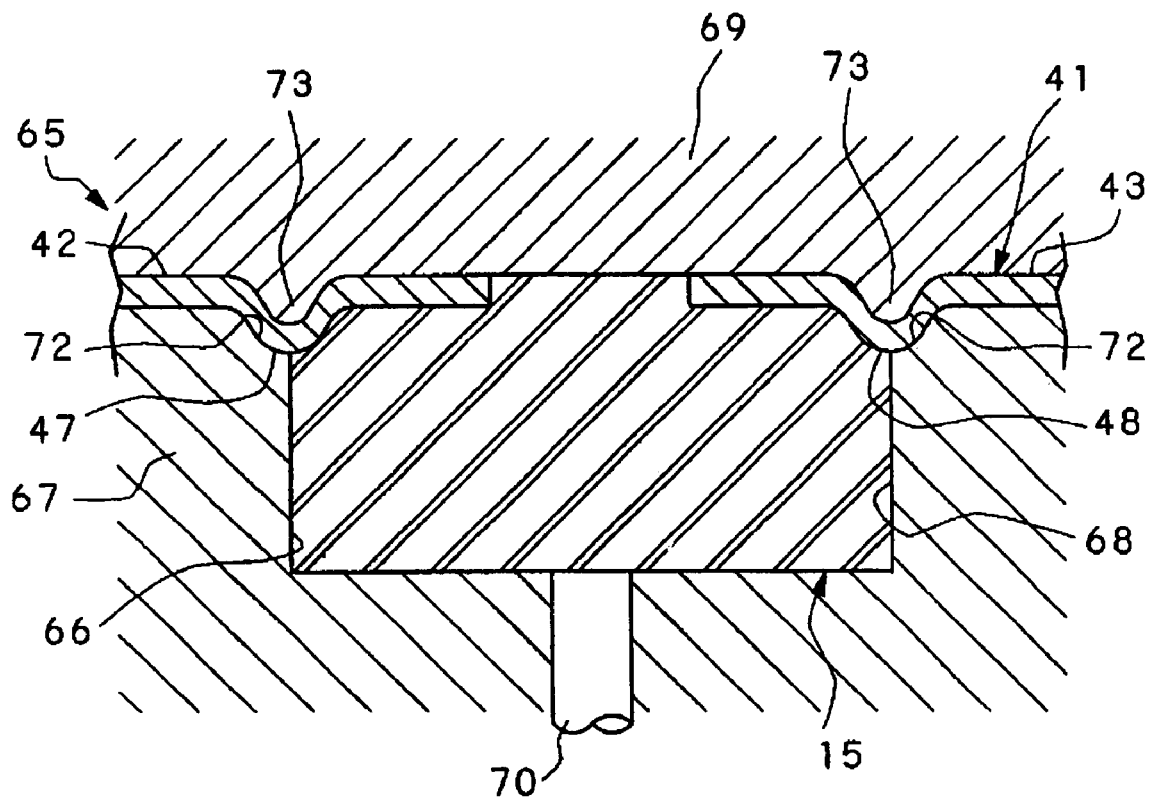
FIG. 12 is a drawing of a front cross-section showing the state after the resin injection into the metal mold used in the external resin packaging according to the transfer mold formation method of the chip capacitor according to the first embodiment of the present invention.

The metal mold 65 shown in FIG. 11 and FIG. 12 will be used in the transfer mold formation method.

This metal mold 65 is mounted so that the lead frame 41 is disposed on the under side of the capacitor element 14, and comprises a lower mold 67 in which the capacitor element 14, the connecting tongue pieces 21 and 31, and the like are accommodated, and in which a cavity formation hole 66 is formed that, except for one part of the base plates 20 and 30 side (that is, the mounting surface 15a side) of the external resin packaging 15, forms the external shape, an upper mold 69 that forms both the cavity formation hole 66 of the lower mold 67 and the cavity 68 by being aligned with the lower mold 67, and forms the external shape of the base plates 20 and 30 of the lead frame, and an ejector pin 70 that is provided that can project into the cavity formation hole 66 from the base surface of the cavity formation hole 66 of the lower mold 67. Moreover, the cavity formation hole 66 is arranged in a plurality of rows in the width direction of the capacitor so as to coincide with each pair of anode lead terminals 42 and cathode lead terminals 43 of the lead frame, which are disposed in a plurality of pairs of rows.

Here, on the upper part of the lower mold 67, convex parts 72 having a bow-shape positioned on the upper side at the outer side are formed so that the outer sides (the sides opposite to the base plates 20 and 30) are fit from the center part of the convex curved parts 47 and 48 of the side piece formation parts 45 and 46 of the lead frame 41 in the terminal arrangement direction into both sides in the terminal arrangement direction and in the direction perpendicular to the terminal arrangement direction of the cavity formation hole 66.

In contrast, on the lower surface of the upper mold 69, curved shape convex parts 73 are formed that are inserted into each of the concave parts 72 such that a predetermined gap maintained open.

In addition, as shown in FIG. 11, on the lower mold 67, the lead frame 41 is mounted such that the capacitor element 14 and the connecting tongue pieces 21 and 31 are accommodated in the cavity formation hole 66, and the convex curved parts 47 and 48 of the side piece formation parts 45 and 46 are fit into the concave parts 72, and at the same time, the upper mold 69 is mounted such that the convex parts 73 fit into the convex curved parts 47 and 48 of the lead frame 41, and closed. At this time, the end surface of the lead frame 41 on the opposite side, relative to the side on which the capacitor element 14 is disposed, coincides with the parting line of the upper mold 69 and the lower mold 67.

Next, as shown in FIG. 12, melted resin is injected into and fills the inside of the cavity 68 formed by the lower mold 67 and the upper mold 69. Thereby, the external resin packaging 15 is formed by the cavity 68.

Figure 13:
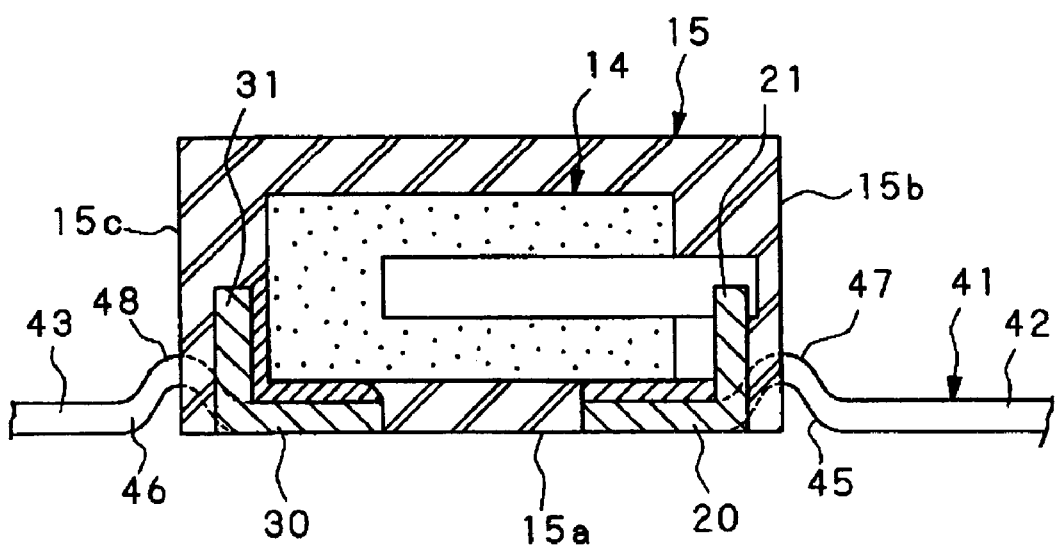
FIG. 13 is a drawing of a front cross-section showing the state of external resin packaging using the transfer mold formation method for the chip capacitor according to the first embodiment of the present invention.

The upper mold 69 is separated from the lower mold 67 under the condition that the melted resin has suitably hardened, and the lead frame 41 that formed the external resin packaging 15 is removed by pressing in the ejector pin 70 inside the cavity formation hole 66 of the lower mold 67, and as shown in FIG. 13, the external resin packaging 15 has a completely formed shape.

In the case of using the above-described transfer mold formation method, the side piece formation parts 45 and 46 of the lead frame 41 are cut along both end surfaces 15b and 15c of the external resin packaging 15 in the terminal arrangement direction (cutting process).

In this manner, the solid electrolyte capacitor 11 having the above-described structure is obtained.

In this manner, in the external resin packaging process, if the external resin packaging 15 is provided up to the center position where the convex curved parts 47 and 48 of the side piece formation parts 45 and 46 are cut, the effects are attained that the shape of the external resin packaging 15 can be adjusted in the terminal arrangement direction without cutting, and the shape of the external resin packaging 15 can be stabilized completely by cutting only the side piece formation parts 45 and 46.

Moreover, the second press process, in which the convex curved parts 47 and 48 of the side piece formation parts 45 and 46 of the lead terminals 42 and 43 are bent, can be carried out before carrying out the resin filling in the external resin packaging process.

Figure 14:
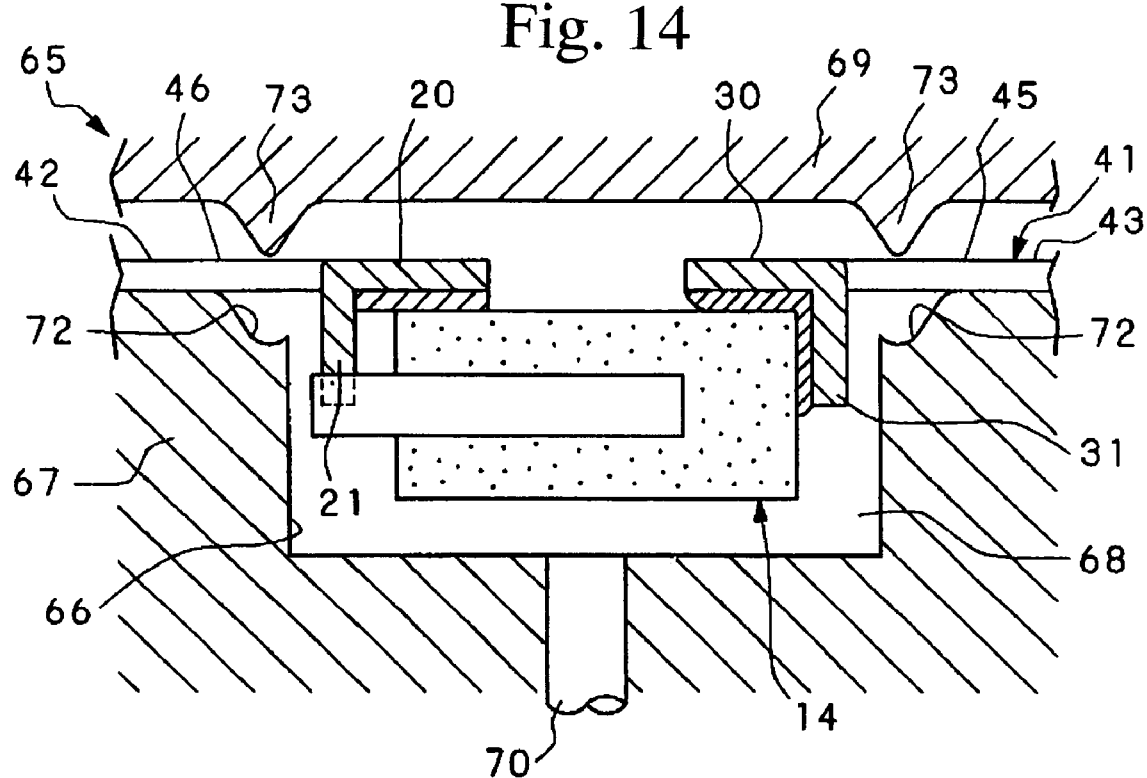
FIG. 14 is a drawing of a front cross-section showing the state before the mold is closed in another example of the metal mold used in the external resin packaging by the transfer mold formation method for the chip capacitor according to the first embodiment of the present invention.

This means that, as shown in FIG. 14, by off-setting the outer edge the concave parts 72 formed in the cavity formation hole 66 of the lower mold 67 of the metal mold 65 in the terminal arrangement direction, the concave part 72 is given a curved shape that is positioned at the upper side at the outer side (the side opposite to the base plates 20 and 30) from an intermediate predetermined position in the terminal arrangement direction, and positioned at the upper side at the inner side (the base plates 20 and 30 side), and the convex curved parts 47 and 48 are press formed by the concave parts 72 and the bow shaped concave part 73 that fits into the concave part 72 with a predetermined gap maintained open therebetween.

Figure 15:
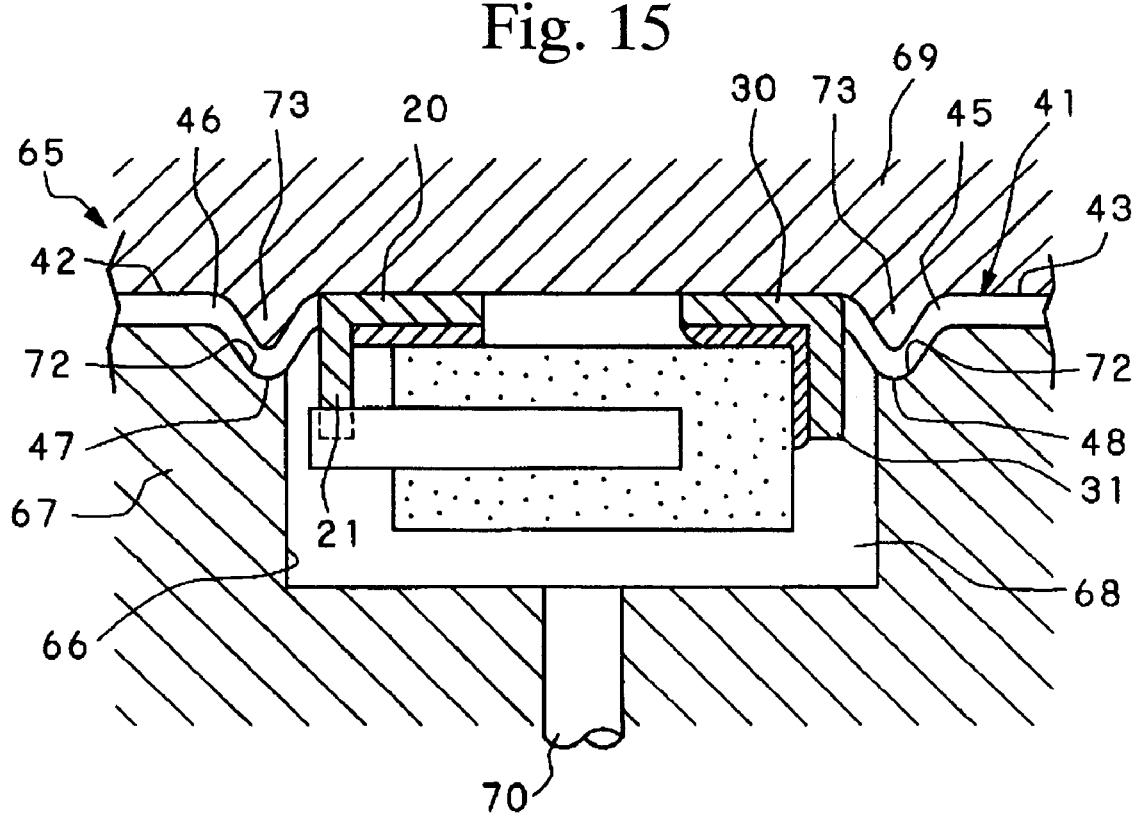
FIG. 15 is a drawing of a front cross-section showing the state after the mold is closed in another example of the metal mold used in the external resin packaging by the transfer mold formation method for the chip capacitor according to the first embodiment of the present invention.

In this case, as shown in FIG. 14, the second press process described above is omitted, and the lead frame 41 where side piece formation parts 45 and 46 have a straight shape is mounted so that the capacitor element 14 and the connecting tongue pieces 21 and 31 are accommodated at a predetermined position within the cavity formation hole 66, and at the same time, the upper mold 69 is mounted on the lead frame 41, and the mold is closed. Thus, as shown in FIG. 15, the convex part 73 of the upper mold 69 pushes the side piece formation parts 45 and 46 into the concave part 72 of the lower mold 67, and thereby the convex curved parts 47 and 48 are bent into form on the side piece formation parts 45 and 46. Of course, the filling of the melted resin is carried out in this closed state.

In this manner, the formation of the convex curved parts 47 and 48 in the second press process can be carried out by the convex parts 73 and the concave parts 72 of the metal mold 65 used in the external resin packaging process, and thus the metal mold 65 can be also use as the metal press mold for forming the convex curved parts 47 and 48. As a result, the effects are attained that the number of metal molds can be reduced and the cost lowered, and in addition, the positional relationship between the external resin packaging end part and the convex curved parts can be easily aligned.

Next, the second embodiment of the present invention will be explained referring to FIG. 16 and FIG. 17, concentrating on the parts that differ from those in the first embodiment. Moreover, the reference numbers are identical for parts that are identical to those of the first embodiment, and their explanation has been omitted.

Figure 16:
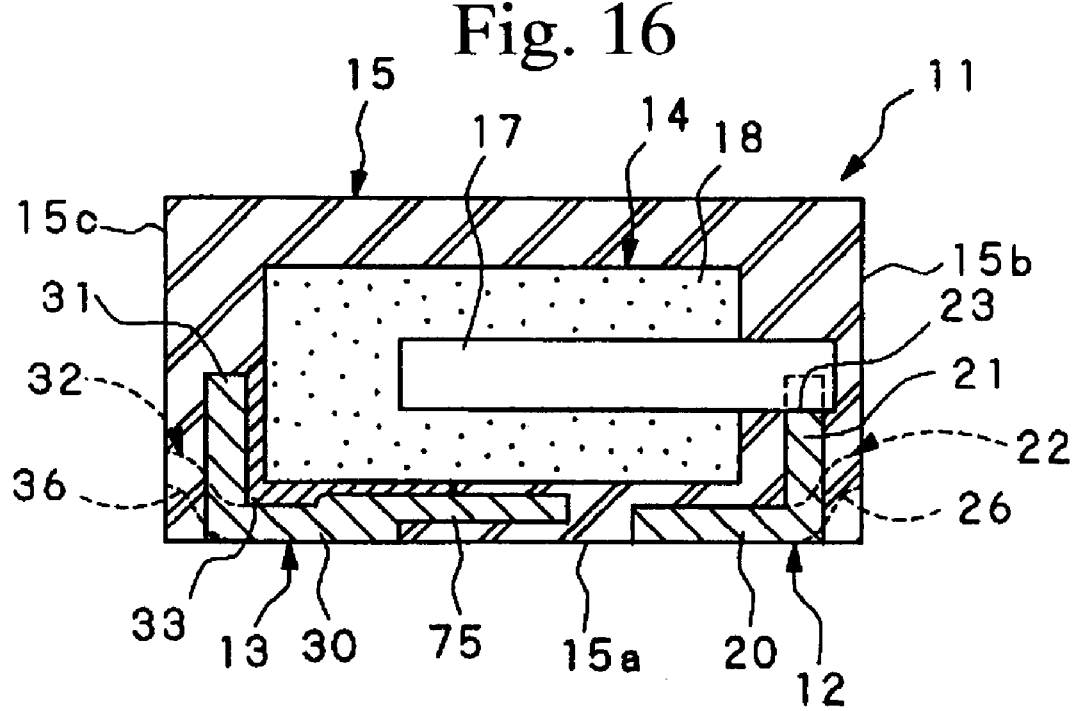
FIG. 16 is a drawing of a front cross-section showing the chip capacitor according to a second embodiment of the present invention.

In the solid electrolyte chip capacitor 11 according to the second embodiment, as shown in FIG. 16, a buried plate 75 is formed that is buried in the external resin packaging 15 and made parallel to the base plate 30 after being bent in the upward direction relative to the connecting tongue 31 to the side of the cathode terminal 13 opposite to the side piece parts 32 of the base plate 30.

Figure 17:
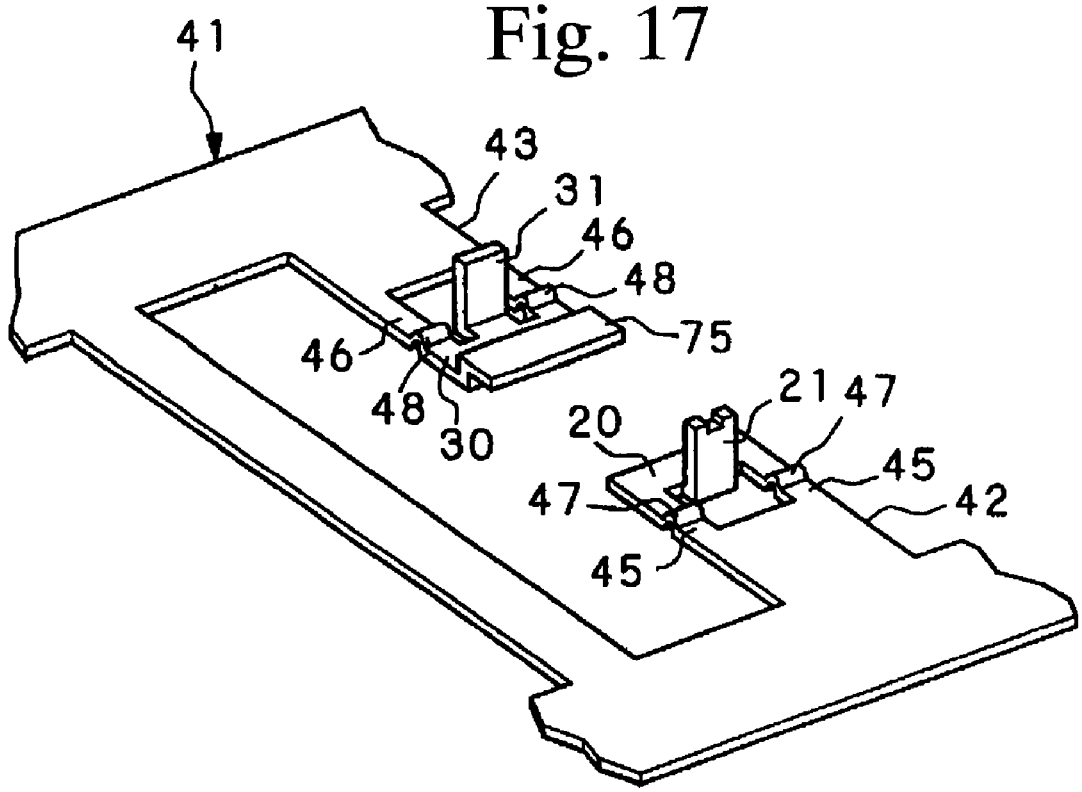
FIG. 17 is a perspective drawing showing the lead frame of the chip capacitor according to a second embodiment of the present invention.

As shown in FIG. 17, this buried plate 75 is formed on the lead frame 41 in the first press process or the second press process. Moreover, the solid electrolyte chip capacitor 11 according to this second embodiment is also fabricated by a method substantially identical to that of the first embodiment.

According to this solid electrolyte chip capacitor 11 of the second embodiment, even in the buried plate 75 parallel to the base plate 30 in the upward direction relative to the connecting tongue piece 31, the cathode terminal 13 is buried in the external resin packaging 15, and thus the occurrence of pealing of the cathode terminal 13 from the external resin packaging 15 can be prevented. In addition, this buried plate 75 is positioned on the capacitor element 14 side beyond the base plate 20 of the anode terminal 12, thus providing an insulating body between the capacitor element 14 and the anode terminal 12, as is the case in the first embodiment, becomes unnecessary.

Figure 18:
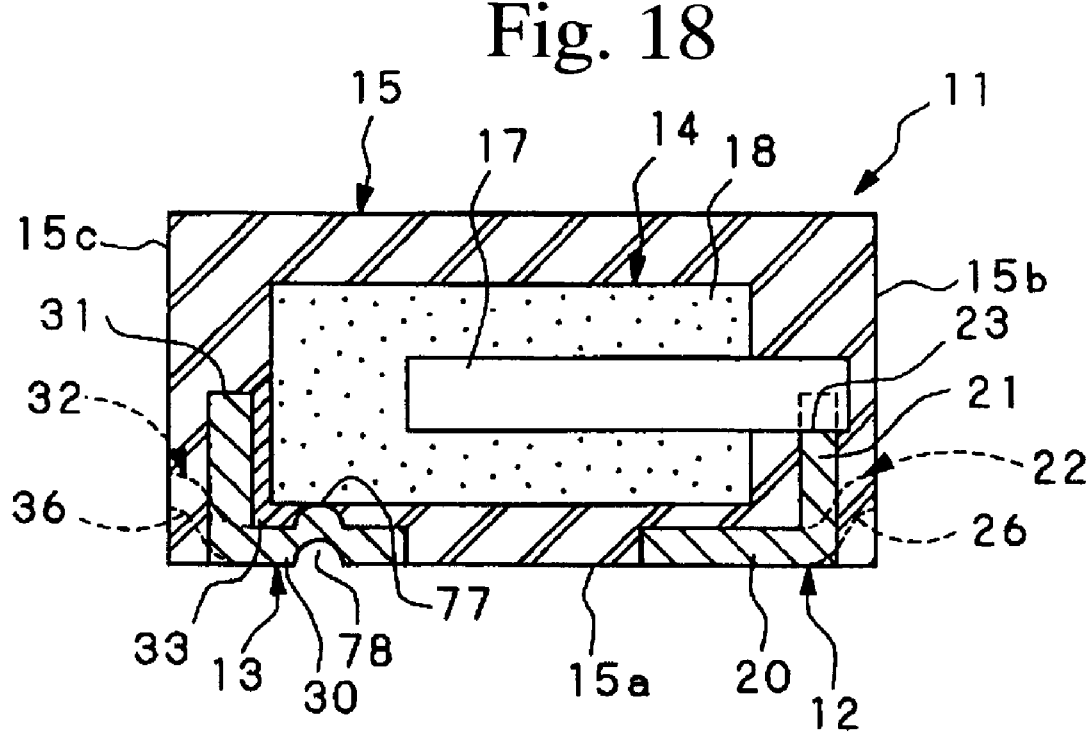
FIG. 18 is a drawing of a front cross-section showing the chip capacitor according to a third embodiment of the present invention.

Next, the third embodiment of the present invention will be explained referring to FIG. 18 and FIG. 19, concentrating on the parts that differ from those in the first embodiment. Moreover, the reference numbers are identical for parts that are identical to those of the first embodiment, and their explanation has been omitted.

In the solid electrolyte chip capacitor 11 of the third embodiment, a convex dam 77 that projects to the capacitor element 14 and abuts the mounting surface 15a of the capacitor element 14 is formed across the capacitor in the width direction on the base plate 30 of the cathode terminal 13. The convex dam 77 has an embossed shape formed by being pushed out by the mold from the side of the base plate 30 opposite to the capacitor element 14, and the pushed-out concave part 78 is formed during the pushing out to the side of the surface of the base plate 30 opposite to the convex dam 77.

Figure 19:
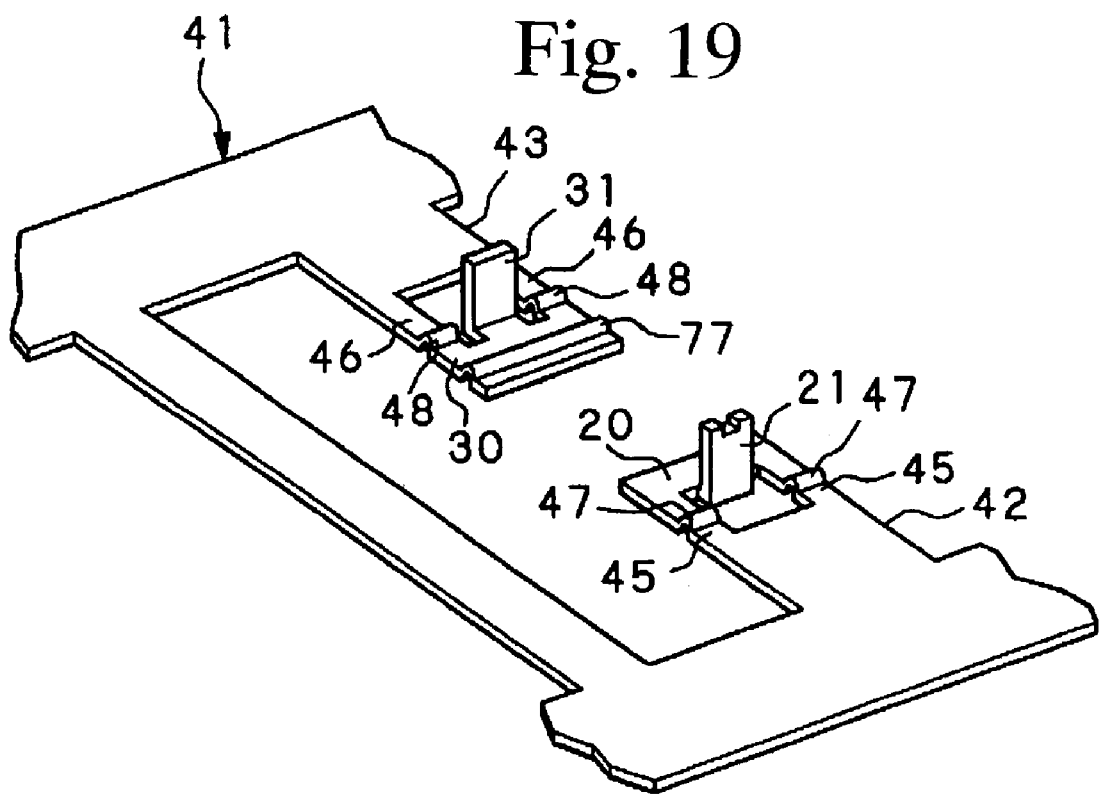
FIG. 19 is a perspective drawing showing the lead frame of the chip capacitor according to a third embodiment of the present invention.

This convex dam 77 is formed on the lead frame 41 as shown in FIG. 19 in the first press process or the second press process. Moreover, the solid electrolyte chip capacitor 11 according to this third embodiment is also fabricated by a method substantially identical to that of the first embodiment.

According to this solid electrolyte capacitor 11 of the third embodiment, a convex dam 77 that projects to the capacitor element 14 and abuts the mounting surface 15a side of the capacitor element 14 is formed, and thus when the capacitor element 14 and to base plate 30 are attached using a conducting adhesive 33 such as a gold paste, the convex dam 77 can stop and prevent the unnecessary flowing out of the conducting adhesive 33, and at the same time, the thickness of the conducting adhesive 33 is uniform, and disparities in the connection strength are eliminated. In addition, because this convex dam 77 is positioned at the capacitor element 14 beyond the base plate 20 of the anode terminal 12, providing an insulating body between the capacitor element 14 and the anode terminal 12, as is the case with the first embodiment, is unnecessary. Moreover, this convex dam 77 is not limited to the above-described embossed shape, but can have a rib shape that only projects to the capacitor element 14 side of the base plate 30.

Next, the fourth embodiment of the present invention will be explained referring to FIG. 20 and FIG. 21, concentrating on the parts that differ from those in the first through third embodiments. Moreover, the reference numbers are identical for parts that are identical to those of the first through third embodiment, and their explanation has been omitted.

Figure 20:
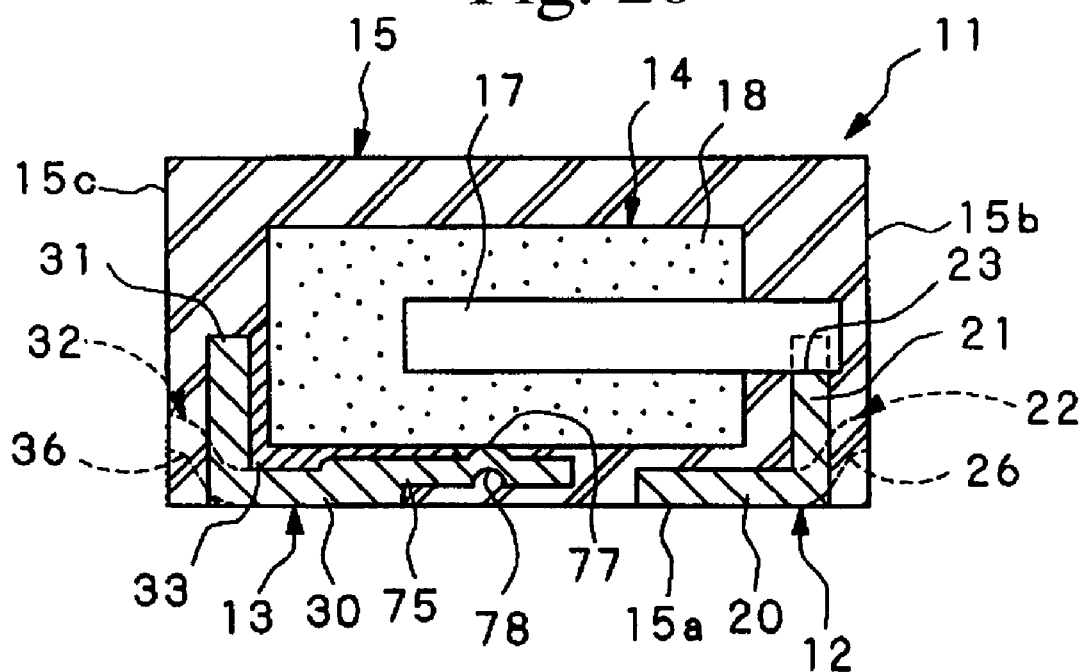
FIG. 20 is a drawing of a front cross-section showing the chip capacitor according to a fourth embodiment of the present invention.

The solid electrolyte chip capacitor 11 according to the fourth embodiment substantially corresponds to a combination of the second embodiment and the third embodiment, and as shown in FIG. 20, a buried plate 75 is formed that is buried in the external resin packaging 15 parallel to the base late 30 after being bent upward relative to the connecting tongue piece 31 to the side of the cathode terminal 13 opposite to the side piece parts 32 of the base plate 30.

In addition, the convex dam 77 that projects to the capacitor element 14 side and abuts on the mounting surface 15a side of the capacitor element 14 is formed across the capacitor in the width direction. This convex part 77 has an embossed shape formed by pushing out with the mold from the side of the buried plate 75 opposite to the capacitor element 14, and the pushed-up concave part 78 is formed while being pushed out to the side of the surface of the base plate 30 opposite to the convex dam 77.

Figure 21:
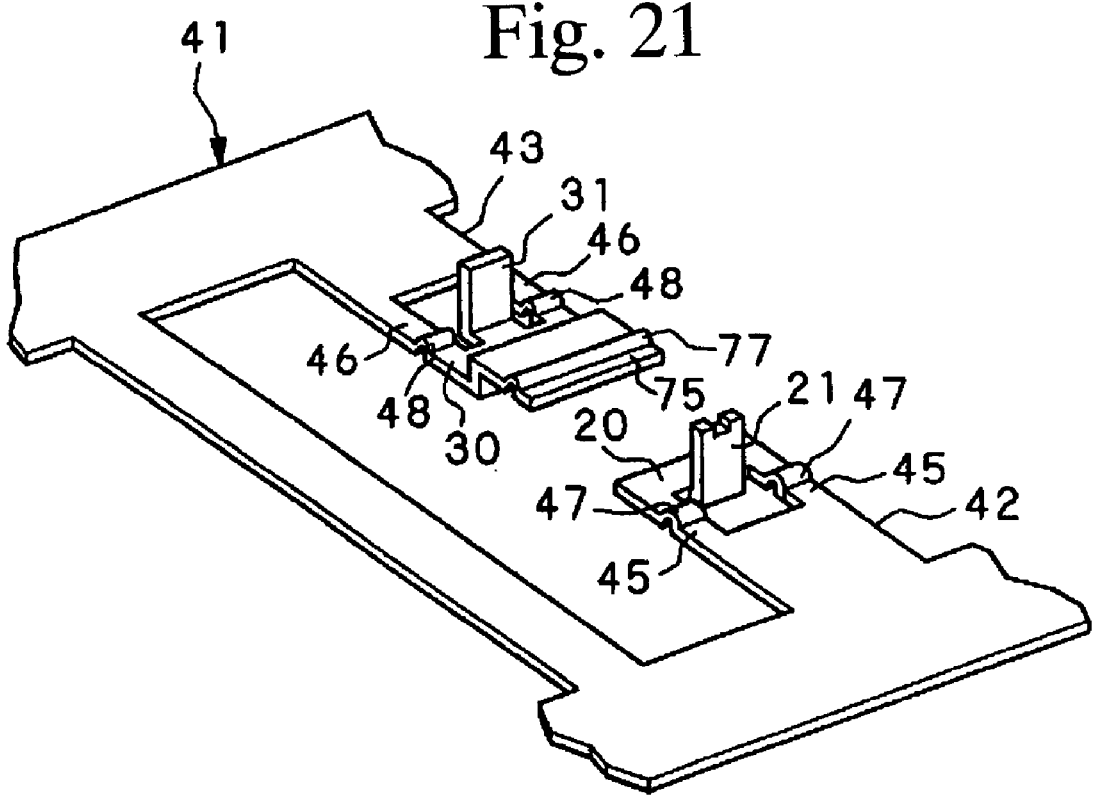
FIG. 21 is a perspective drawing showing the lead frame of the chip capacitor according to a fourth embodiment of the present invention.

The buried plate 75 having the convex dam 77 described above is formed on the lead frame 41 as shown in FIG. 21 in the first press process or the second press process. The solid electrolyte chip capacitor 11 of this fourth embodiment is fabricated by a method substantially identical to that of the first embodiment.

According to this solid electrolyte chip capacitor of the fourth embodiment, effects are attained that are identical to those of the second and third embodiments.

Figure 22:
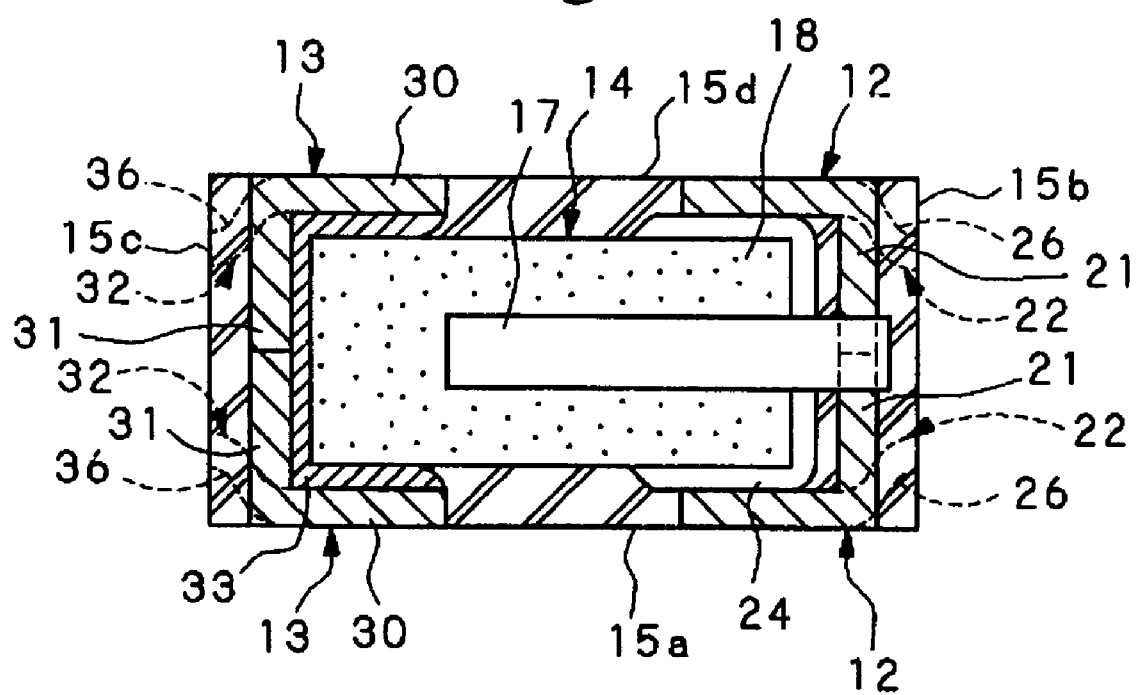
FIG. 22 is a drawing of a front cross-section showing chip capacitor according to the first embodiment of the present invention altered by both surfaces of the mounting mold.

Moreover, in the first through fourth embodiments described above, examples of a mounting mold for one side having the mounting surface 15a on one surface only was respectively explained, but as shown in FIG. 22, a group of anode terminals 12 and cathode terminals 13 connected to the capacitor element 14 being provided respectively on the two surfaces 15a and 15b on opposite sides of the external resin packaging 15, and a two-sided mounting mold where these opposite surfaces serve as the mounting surfaces 15a and 15d can be adapted.

This means that, as shown in FIG. 22, the anode terminal 12 and the cathode terminal 13 can be provided on both side of the mounting surfaces 15a and 15d, like the first embodiment, the anode terminal 12 on both sides connected to the anode lead 17 of the capacitor element 14, the cathode terminal 13 on both sides can be connected to the element body 18 of the capacitor element 14 via a conducting adhesive 33 such as gold paste, and an insulating body 24 can be interposed between the anode terminal 12 on both sides and the element body 18 of the capacitor element 14. Thereby, identifying the front and back during packaging becomes unnecessary, and at the same time, the parallel connections overlapping in the thickness direction become easy to implement, and thus uses expand.

Moreover, FIG. 22 is an example of the case in which the anode terminal 12 and cathode terminal 13 are respectively provided on both sides of the mounting surfaces 15a and 15b, but like any of the second through fourth embodiments, of course the anode terminal 12 and cathode terminal 13 can be respectively provided on both sides of the mounting surfaces 15a and 15d.

As described above, according to a first aspect of the chip capacitor of the present invention, curved parts are formed by press processing that extend beyond the connecting tongue pieces rising in a diagonal direction relative to the connecting tongue pieces to the external end surface, the side piece parts are exposed beyond the mounting surface to the external end surface of the external resin packaging at the side where the connecting tongue pieces rise, and at the same time, the mounting surface side is also exposed up to the end of the external end surface.

Thereby, when the side piece parts are soldered to the printed circuit board by reflow soldering, the solder is trapped in the space under of the curved part of the side piece parts, and as a result, the occurrence of the chip-standing phenomenon can be prevented. Therefore, the occurrence of the chip-standing phenomenon can be prevented even when carrying out soldering using reflow soldering, and furthermore, this is in line with small size and decreasing weight.

Furthermore, because the curved parts are formed by press bending processing, fabrication is easy and the cost increases can be restrained.

In addition, because the structure has curved parts formed beyond the connecting tongue piece to the external end surface side of the external resin packaging, in other words, a structure in which the curved parts are interposed between the external end surface and the connecting tongue piece, a gap between the external end surface and the connecting tongue piece can be reliably opened, and positional relationships are attained in which the connecting tongue pieces can be reliably buried in the external resin packaging. As a result, the remarkable effects are attained that the capacitor element connected to a connecting tongue piece can be reliably buried in the external resin packaging, the moisture resistance can be maintained, and in particular, the leakage current characteristics can be maintained.

According to a second aspect of the chip capacitor of the present invention according to the first aspect, the curved parts have a bow shape, and thereby the contact surface area in a curved part with the solder can be made large, and the reliability of the connection can be increased. In addition, because the curved parts are exposed, visual confirmation of the connection by the solder during packaging is easy.

According to a third aspect of the chip capacitor of the present invention, the areas of both terminals exposed to the mounting surface side are equal to each other, and thus the contact area with the printed circuit board is equal, and as a result, the occurrence of the chip standing phenomenon during reflow soldering can be reliable prevented.

A fourth aspect of the chip capacitor of the present invention, the height of a curved part from the mounting surface is two times the height of the thickness of the base plate or greater, and thus the solder can be sufficiently trapped in the space under the curved parts, and as a result, the occurrence of the chip standing phenomenon during reflow soldering can be reliably prevented.

According to a fifth aspect of the chip capacitor of the present invention, the terminal of the cathode is buried in the external resin packaging in the buried part parallel to the base plate in the upward direction relative to the connecting tongue piece, and thus the occurrence of pealing of the terminal from the external resin packaging can be prevented.

According to a sixth aspect of the chip capacitor of the present invention, a convex dam that projects to the capacitor element side and abuts the mounting surface side of the capacitor element is formed on the base plate, and thus when the capacitor element and the base plate are attached using a conducting adhesive such as gold paste, unnecessary flowing out of the conducting adhesive can be prevented, and at the same time the thickness of the conducting adhesive becomes uniform and the disparities in the connection strength is eliminated.

According to a seventh aspect of the chip capacitor of the present invention, the external resin packaging is formed by a liquid resin being printed using a squeegee, and thus a metal transfer mold, which is expensive and difficult to fabricate, is not necessary, and as a result, the fabrication costs can be reduced, and at the same time design changes can be responded to immediately.

According to an eighth aspect of the chip capacitor of the present invention the external resin packaging is formed using a transfer mold formation method, and thus the form of the external resin packaging can be stabilized.

According to a ninth aspect of the chip capacitor of the present invention both the anode and cathode connected to the capacitor element are respectively provided on the two opposing surfaces of the external resin packaging, and thus there is a two-sided mounting structure and identifying the front and back during packaging becomes unnecessary, and at the same time, the arrangement of the connections overlapping in the thickness direction become easy to implement, and thus uses expand.

According to a fabrication method for a tenth aspect of a chip capacitor of the present invention, in a first press process, a pair of lead terminals are formed on the flat lead frame so as to be opposite each other and at the same time connecting tongue pieces are formed by cutting out the center part of these lead terminals in the width direction; in a second press process, convex curved parts are formed that project in an upward diagonal direction relative to the connecting tongue pieces to the side piece formation parts on both sides of the connection tongue pieces in the width direction; in a connection process, the capacitor element is connected to the connecting tongues of the pair of lead terminals formed in the first process; in an external resin packaging process, the sides of the pair of lead terminals opposite to each other and the capacitor element connected to the pair of lead terminals are integrated by an external resin packaging; and in a cutting process, the side piece formation parts are cut at the middle position of the convex curved parts.

Thereby, by forming convex curved parts by a press process that curve in an upward diagonal direction relative to the connecting tongue pieces to the external end surface side of the external resin package beyond the connecting tongue to the side piece parts of the terminals, the side piece parts are exposed more in the upward diagonal direction on the external end surface than the mounting surface, and at the same time a shape can be easily formed for which the mounting surface also is exposed up to the end of the external resin packaging.

According to a fabrication method for a chip capacitor of an eleventh aspect of the present invention, the external resin packaging is formed by a liquid resin being printed with a squeegee in the external resin packaging process, and thus a metal transfer mold, which is high cost and difficult to fabricate, becomes unnecessary, and as a result, fabrication costs can be reduced, and design change can be responded to immediately.

According to a fabrication method for a chip capacitor of a twelfth aspect of the present invention, the external resin packaging is provided up to the outer side of the convex curved part of the side piece formation parts in the external resin packaging process and the external resin packaging is cut on the plane that intersects the center position of the convex curved part of the side piece formation parts, and thus the elimination of the seams at the corners of the external resin packaging produced when the external resin packaging is formed by the liquid resin being printed with a squeegee and adjustment of the shape of the external resin packaging can be carried out in coordination with the cutting of the side piece formation parts.

According to a fabrication method of the chip capacitor of a twelfth aspect of the present invention, the external resin packaging process provides the external resin packaging up to the center position of the convex curved part of the side piece formation parts by a transfer mold formation method, and thus the shape can be adjusted without cutting the external resin packaging, and can be completed by cutting only the side piece formation parts.

According to a fabrication method of the chip capacitor of the fourteenth aspect of the present invention the formation of the convex curved parts in the second press process are carried out with a metal transfer mold used in the external resin packaging process, and thus the metal transfer mold can also be used as a metal press mold for the formation of the convex curved parts. Thus, the number of metal molds can be decreased, and the cost can be decreased.

According to a metal mold according to a fifteenth aspect of the present invention, the formation of the convex curved parts in the second press process can be carried out using the convex part and the concave part of the metal transfer mold used in the external resin packaging process, and thus the metal transfer mold can also be used as a metal press mold for the formation of the convex curved parts. Thus, the number of metal molds can be reduced, the cost reduced, and in addition, the positional relation between the external resin packaging end part and the convex curved parts can be made to coincide easily.

What is claimed is:

1. A chip capacitor having an external resin packaging formed such that a capacitor element is connected to both anode and cathode terminals thereof, wherein:

both of said terminals comprise a flat base plate that are exposed on a mounting surface side of said external resin packaging, connecting tongue pieces that rise relative to said flat base plate and are connected to said capacitor element, and side piece parts that extend beyond said connecting tongue piece from said flat base plate to an external end surface of said external resin packaging in a direction opposite to said flat base plate, and further wherein, ends of said side piece parts are exposed beyond said mounting surface side to said external end surface of said external resin packaging at a diagonally rising side due to curved parts being formed by press processing that extend beyond said connecting tongue pieces rising in a diagonal direction relative to said connecting tongue pieces to said external end surface, and at the same time said mounting surface side is also exposed up to said external end surface.

2. A chip capacitor according to claim 1 wherein said curved parts have a bow shape.

3. A chip capacitor according to claim 1 wherein areas of both of said terminals exposed on said mounting surface side are equal to each other.

4. A chip capacitor according to claim 1 wherein the height of said curved parts from said mounting surface side is two times the height of the thickness of said flat base plate or greater.

5. A chip capacitor of the present invention according to claim 1 wherein said terminal of the cathode has a buried plate that is buried in said external resin packaging parallel to said flat base plate after being bent in the upward direction relative to said connecting tongue piece on the side of said flat base plate opposite to said side piece parts.

6. A chip capacitor of the present invention according to claim 1 wherein a convex dam that projects to a side of said capacitor element and abuts said mounting surface side of said capacitor element is formed on said flat base plate.

7. A chip capacitor of the present invention according to claims 1 wherein said external resin packaging being formed by a liquid resin is printed using a squeegee.

8. A chip capacitor of the present invention according to claims 1 wherein said external resin packaging is formed using a transfer mold formation method.

9. A chip capacitor of the present invention according to claim 1 wherein a set of both said anode and cathode connected to said capacitor element are respectively provided on the two opposing surfaces of said external resin packaging.

* * * * *

UNITED STATES PATENT AND TRADEMARK OFFICE
CERTIFICATE OF CORRECTION

PATENT NO. : 6,430,034 B2
DATED : August 6, 2002
INVENTOR(S) : Sano et al.

It is certified that error appears in the above-identified patent and that said Letters Patent is hereby corrected as shown below:

<u>Column 20,</u>
Line 51, "surfacc" should read -- surface --

Signed and Sealed this

Twenty-fifth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,430,034 B2
DATED        : August 6, 2002
INVENTOR(S)  : Sano et al.

It is certified that error appears in the above-identified patent and that said Letters Patent is hereby corrected as shown below:

<u>Title page,</u>
Item [73], "NEC Corporation" should read -- NEC TOKIN Corporation --

Signed and Sealed this

Twenty-second Day of July, 2003

JAMES E. ROGAN
*Director of the United States Patent and Trademark Office*